(12) United States Patent
Lalezari et al.

(10) Patent No.: US 11,709,251 B1
(45) Date of Patent: Jul. 25, 2023

(54) RADAR NODE WITH FULL AZIMUTHAL COVERAGE, AND ASSOCIATED SURVEILLANCE METHODS

(71) Applicant: FIRST RF Corporation, Boulder, CO (US)

(72) Inventors: Farzin Lalezari, Boulder, CO (US); Ian Rumsey, Erie, CO (US); Luke Sankey, Berthoud, CO (US)

(73) Assignee: FIRST RF Corporation, Boulder, CO (US)

( * ) Notice: Subject to any disclaimer, the term of this patent is extended or adjusted under 35 U.S.C. 154(b) by 310 days.

(21) Appl. No.: 17/117,031

(22) Filed: Dec. 9, 2020

(51) Int. Cl.
| | |
|---|---|
| *G01S 13/87* | (2006.01) |
| *G01S 7/00* | (2006.01) |
| *G01S 13/00* | (2006.01) |
| *G01S 13/931* | (2020.01) |
| *G01S 13/66* | (2006.01) |
| *G01S 13/42* | (2006.01) |

(52) U.S. Cl.
CPC .............. *G01S 13/87* (2013.01); *G01S 7/003* (2013.01); *G01S 13/003* (2013.01); *G01S 13/42* (2013.01); *G01S 13/66* (2013.01); *G01S 13/931* (2013.01)

(58) Field of Classification Search
CPC ........ G01S 13/87; G01S 7/003; G01S 13/003; G01S 13/42; G01S 13/66; G01S 13/931
USPC ...................................................... 342/195
See application file for complete search history.

(56) References Cited

U.S. PATENT DOCUMENTS

| | | | |
|---|---|---|---|
| 4,499,468 A | 2/1985 | Montana et al. | |
| 4,642,649 A * | 2/1987 | Lightfoot | G01S 5/04 |
| | | | 342/458 |
| 5,343,212 A * | 8/1994 | Rose | G01S 11/04 |
| | | | 342/458 |
| 5,448,243 A | 9/1995 | Bethke et al. | |
| 5,657,027 A * | 8/1997 | Guymon, II | G01S 3/48 |
| | | | 342/442 |
| 6,690,318 B1 | 2/2004 | Tsunoda | |
| 7,626,538 B2 * | 12/2009 | Rose | G01S 3/46 |
| | | | 342/107 |
| 8,462,040 B2 | 6/2013 | Venkatachalam | |
| 8,525,724 B2 * | 9/2013 | Insanic | G01S 13/951 |
| | | | 342/26 D |
| 8,576,110 B2 * | 11/2013 | Valentine | G01S 13/66 |
| | | | 342/28 |
| 8,988,274 B2 | 3/2015 | Zhang et al. | |
| 9,778,357 B2 | 10/2017 | Zhang et al. | |
| 10,823,843 B1 * | 11/2020 | Kendra | G01S 13/9023 |

(Continued)

*Primary Examiner* — Nuzhat Pervin
(74) *Attorney, Agent, or Firm* — Cozen O'Connor

(57) ABSTRACT

A pair of radar nodes, each with full azimuthal coverage, cooperate to identify the position of an object without explicit measurements of the object's azimuthal coordinate. A first radar node, operating within a first azimuth field of view (FOV), measures a first elevation angle and a first slant range of the object. A second radar node, operating within a second azimuth FOV, measures a second elevation angle and a second slant range of the object. The second radar node transmits the data to the first radar node, which identifies, based on the first and second azimuth FOVs, an object half space within which the object is located. The first radar node then calculates the position of the object without an ambiguous solution. Alternatively, the first radar uses the first and second azimuth FOVs to identify and reject the ambiguous solution.

49 Claims, 12 Drawing Sheets

(56) References Cited

U.S. PATENT DOCUMENTS

| | | | |
|---|---|---|---|
| 11,249,183 B2* | 2/2022 | Kendra | G01S 13/9023 |
| 11,422,253 B2* | 8/2022 | Mahmoud | G01S 7/41 |
| 11,493,620 B2* | 11/2022 | Ray | G01S 13/934 |
| 2004/0000002 A1* | 1/2004 | Hollander | A41B 9/06 |
| | | | 2/69 |
| 2009/0109082 A1* | 4/2009 | Rose | G01S 13/86 |
| | | | 342/73 |
| 2011/0025494 A1* | 2/2011 | Adcook | G01S 15/10 |
| | | | 340/539.13 |
| 2012/0086596 A1* | 4/2012 | Insanic | G01S 13/951 |
| | | | 342/26 D |
| 2013/0000006 A1* | 1/2013 | Norton | A63B 71/145 |
| | | | 2/16 |
| 2013/0000009 A1* | 1/2013 | Portas | A42B 1/12 |
| | | | 2/68 |
| 2014/0028494 A1* | 1/2014 | Ksienski | G01S 13/887 |
| | | | 342/25 A |
| 2015/0000003 A1* | 1/2015 | Blakely | A41D 13/0015 |
| | | | 2/69 |
| 2015/0355324 A1* | 12/2015 | Minear | G01S 13/93 |
| | | | 342/146 |
| 2017/0000010 A1* | 1/2017 | Raetzman | A01C 5/066 |
| 2018/0088221 A1* | 3/2018 | Yomo | G01S 7/003 |
| 2019/0204435 A1* | 7/2019 | Poiger | G01S 13/878 |
| 2020/0158862 A1* | 5/2020 | Mahmoud | G01S 13/931 |
| 2020/0370920 A1* | 11/2020 | Ahmed | G01S 13/89 |
| 2022/0066012 A1* | 3/2022 | Jansen | G01S 7/0235 |
| 2022/0066015 A1* | 3/2022 | Burghardt | G01S 13/582 |
| 2022/0146623 A1* | 5/2022 | Lao | G01S 7/03 |
| 2022/0350010 A1* | 11/2022 | Sagi | G01S 13/88 |

* cited by examiner

RADAR NODE WITH FULL AZIMUTHAL COVERAGE, AND ASSOCIATED SURVEILLANCE METHODS

BACKGROUND

Unmanned aerial systems (UASs) are being increasingly used for a variety of applications, including surveillance, communications, cargo transport, agriculture, law enforcement, and scientific research. Also known as unmanned aircraft systems, unmanned aerial vehicles (UAVs), and "drones", UASs lack a human pilot, and therefore can be made much smaller than crewed aircraft. This small size reduces cost and power consumption, and eliminates on-board systems needed for human physiology and human safety. The lack of pilot and crew also makes UASs ideal platforms for high-endurance missions lasting several days, or longer.

SUMMARY

Increasing use of UASs threatens airspace security in many ways. For example, more UASs leads to more accidents, such as collisions between UASs, collisions between UASs and other flying objects (e.g., airplanes, birds), and crashes. Debris from such accidents can injure nearby people and buildings. There is also concern about UASs being used to deliver dangerous payloads with malicious intent, either to civilian or military targets. Examples of such payloads include explosives, chemical or biological hazards, and radioactive materials. Other examples of malicious intent include wireless hijacking and control of UASs, electronic jamming, and spying.

The present embodiments feature mobile, monostatic radar nodes that cooperate to detect a UAS and determine its position in three spatial dimensions. Each radar node has full azimuthal coverage (i.e., 360°), and therefore can fully track the movement of the UAS regardless of how it moves and/or how each of the radar nodes move. The present embodiments can be used to monitor UASs as a proactive measure to prevent accidents or identify potential malicious intent. The present embodiments may also be used as part of a counter unmanned air system that uses the identified UAS position to jam, take control of, and/or damage the UAS. The present embodiments may also be used to locate and track other moving objects that are detectable by radar (e.g., ground vehicles, cars, trucks, boats, etc.) without departing from the scope hereof.

Each radar node has an antenna structure in which a plurality of panels is arranged as a right polygonal prism, where each panel includes a transmitting antenna array and a receiving antenna array. Each radar node uses one of its panels to measure the slant distance to the UAS using conventional radar techniques (e.g., monopulse, continuous-wave, pulsed Doppler, etc.). However, rather than measuring the azimuthal angle of the UAS, each radar node uses the geometry of the panels to place bounds on the azimuthal angle. For example, in one embodiment, the antenna structure of each radar node contains five panels arranged as a right pentagonal prism. When only one panel operates to detect the UAS, the radar node bounds the azimuthal location of the UAS to within a 720 azimuthal sector.

A first radar node transmits a first slant distance and first set of azimuthal bounds to a second radar node, which measures a second slant distance to the UAS position, and determines a second set of azimuthal bounds. By combining slant distances and azimuthal bounds with the locations of the nodes, the second radar node solves for the UAS position without any explicit measurement of the UAS's azimuthal position. Advantageously, this pair of radar nodes can obtain this one unique solution without a second ambiguous solution, as typically occurs in true-range trilateration in two Cartesian dimensions.

In embodiments, a radar node includes a plurality of antenna arrays arranged to transmit and receive radar beams with full azimuthal coverage. The radar node also includes an electronics module coupled to the plurality of antenna arrays. The electronics module includes a processor and a memory communicably coupled with the processor. The memory stores machine-readable instructions that, when executed by the processor, control the electronics module to receive a first radar position of an external radar node, a first elevation angle and a first slant range of an object measured by the external radar node, and a first azimuth field-of-view (FOV) of the external radar node within which the object was detected. The machine-readable instructions also control the electronics module to operate at least one of the plurality of antenna arrays to measure a second elevation angle and a second slant range of the object within a second azimuth FOV of said at least one of the plurality of antenna arrays. The machine-readable instructions also control the electronics module to identify, based on the first and second azimuth FOVs, an object half space within which the object is located. The half space is one of first and second half spaces separated by a vertical baseline plane that intersects the first radar position and a second radar position of the radar node. The machine-readable instructions also control the electronics module to calculate a position of the object within the object half space based on the first and second elevation angles, the first and second slant ranges, and the first and second radar positions. The machine-readable instructions also control the electronics module to output the position of the object.

In other embodiments, a surveillance method includes measuring, with a first radar node located at a first radar position and operating within a first azimuth FOV, a first elevation angle and a first slant range of an object. The method also includes measuring, with a second radar node located at a second radar position and operating within a second azimuth FOV, a second elevation angle and a second slant range of the object. The method also includes transmitting the first radar position, the first elevation angle, the first azimuth FOV, and the first slant range to the second radar node. The method also includes identifying, based on the first and second azimuth FOVs, an object half space within which the object is located, the half space being one of first and second half spaces separated by a vertical baseline plane that intersects the first and second radar positions. The method also includes calculating a position of the object within the object half space based on the first and second elevation angles, the first and second slant ranges, and the first and second radar positions.

DETAILED DESCRIPTION OF THE EMBODIMENTS

Figure 1:
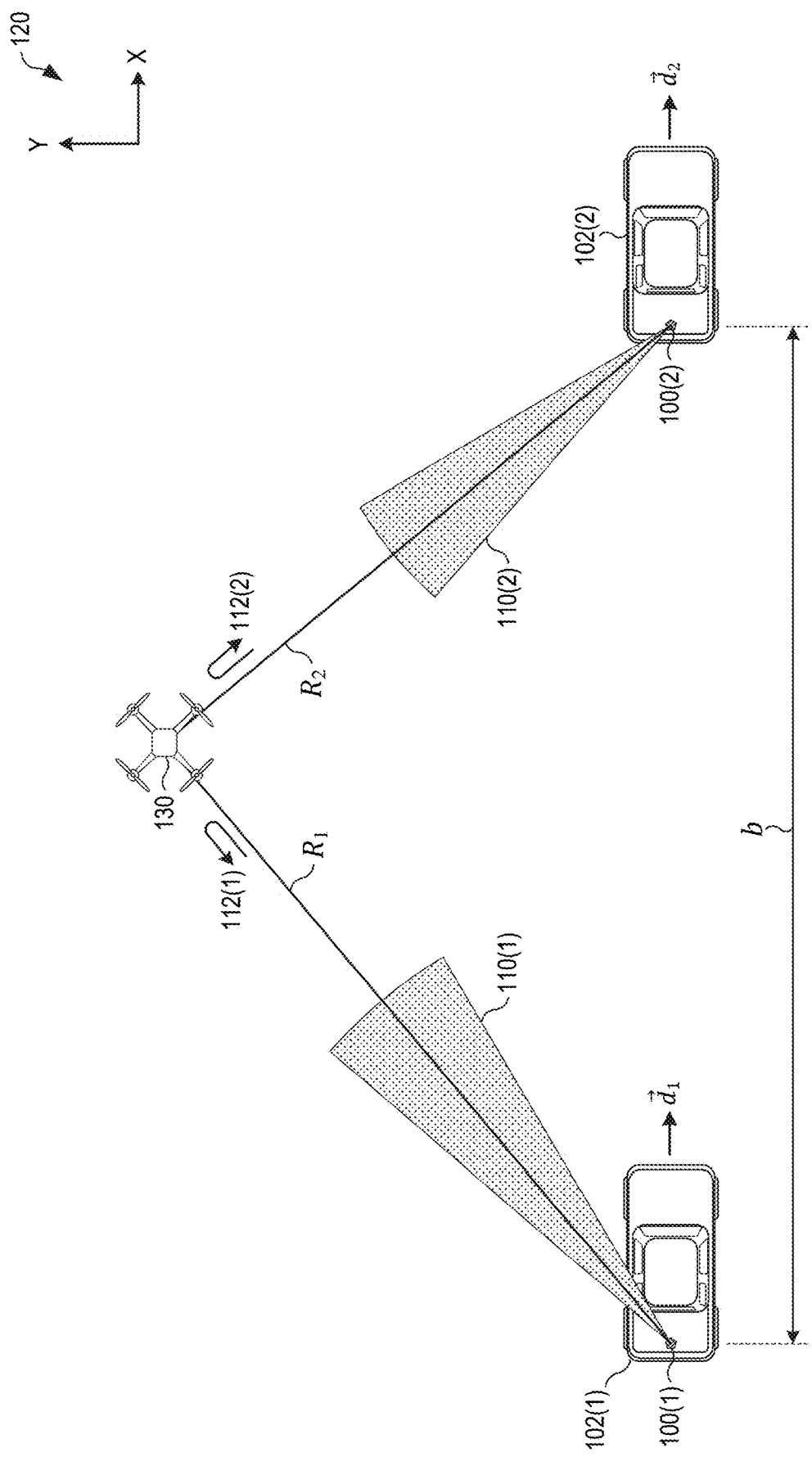
FIGS. 1 and 2 illustrate first and second radar nodes cooperating to locate and track an unmanned aerial system (UAS), in an embodiment.
Figure 2:
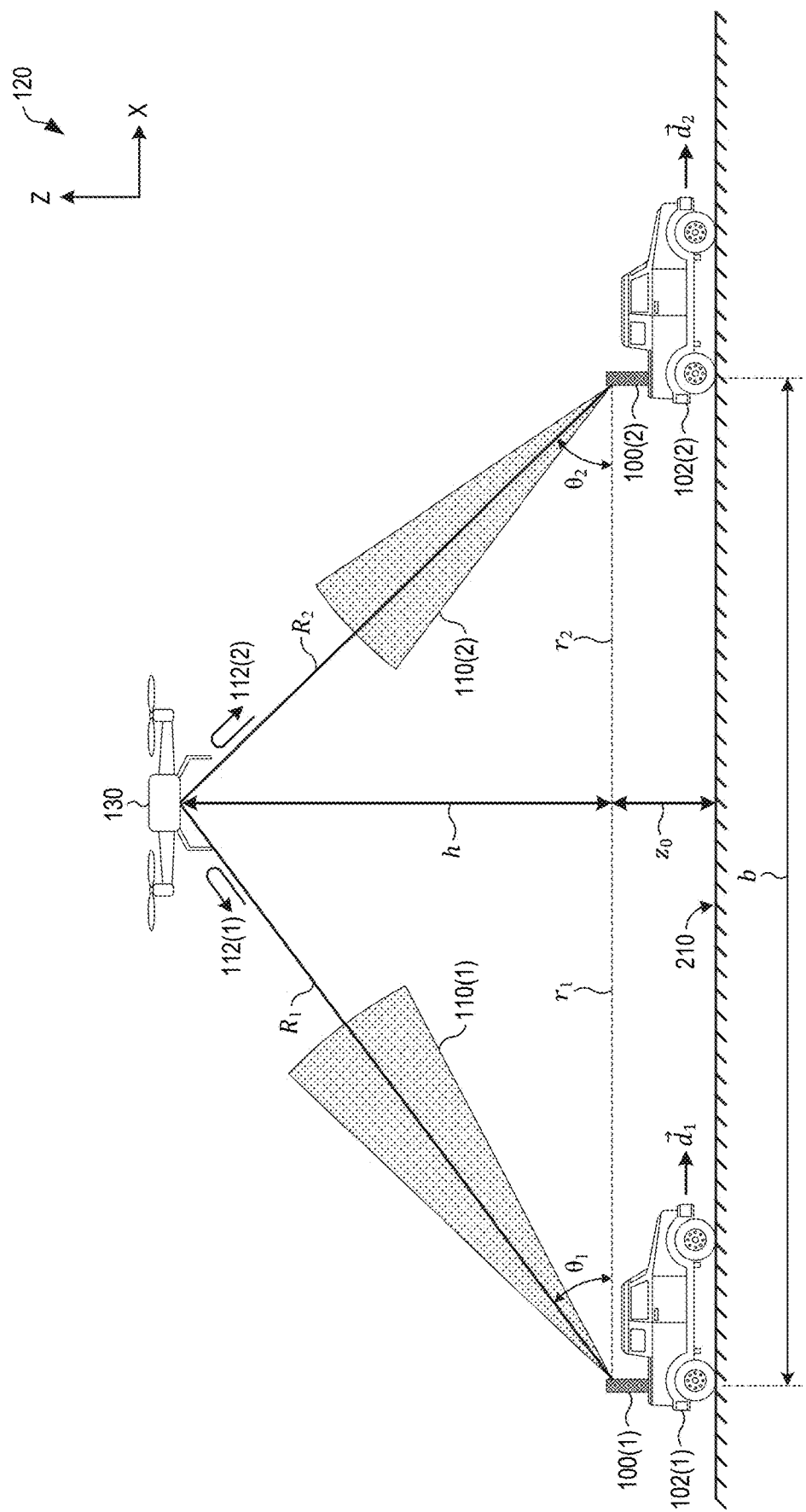

FIGS. 1 and 2 illustrate first and second radar nodes 100(1), 100(2) cooperating to locate and track an unmanned aerial system (UAS) 130. The first radar node 100(1) is a monostatic radar system that transmits a first radar beam 110(1) and receives a first reflection 112(1) of the first radar beam 110(1) off the UAS 130 to measure a first slant range $R_1$ between the first radar node 100(1) and the UAS 130. Similarly, the second radar node 100(2) is a monostatic radar system that transmits a second radar beam 110(2) and receives a second reflection 112(2) of the second radar beam 110(2) off the UAS 130 to measure a second slant range $R_2$ between the second radar node 100(2) and the UAS 130. The first radar node 100(1) can transmit the first radar beam 110(1) in any azimuthal direction, and is therefore described as providing full azimuthal coverage. Similarly, the second radar node 100(2) can transmit the second radar beam 110(2) in any azimuthal direction, and therefore also provides full azimuthal coverage.

The first and second radar nodes 100(1), 100(2) are mounted on respective first and second vehicles 102(1), 102(2) that are spatially separated by a baseline b, which may range from a few meters to tens of kilometers, or more. In FIGS. 1 and 2, the first vehicle 102(1) and first radar node 100(1) move in a first direction $\vec{d}_1$, and the second vehicle 102(2) and second radar node 100(2) move in a second direction $\vec{d}_2$. Each of the first and second directions $\vec{d}_1$, $\vec{d}_2$ may be defined by an azimuthal angle relative to a global reference direction (e.g., true north), and therefore the first and second directions $\vec{d}_1$, $\vec{d}_2$ are also referred to as first and second bearings, respectively. The first and second directions $\vec{d}_1$, $\vec{d}_2$ may be obtained from the directions of corresponding velocity vectors $\vec{v}_1$, $\vec{v}_2$ of the first and second vehicles 102(1), 102(2). For clarity in FIGS. 1 and 2, the first and second directions $\vec{d}_1$, $\vec{d}_2$ are shown as vectors aligned with the +x axis of a right-handed coordinate system 120, and therefore the first and second radar nodes 100(1), 100(2) maintain the same constant y coordinate as the first and second vehicles 102(1), 102(2) move. Alternatively, one or both of the first and second vehicles 102(1), 102(2) may be at rest. In this case, each direction $\vec{d}$ still indicates an orientation of the corresponding vehicle 102, even though the corresponding vehicle 102 has a speed of zero.

Denoting an object position of the UAS 130 by $\vec{u}=(x_U, y_U, z_U)$ and a first radar position of the first radar node 100(1) by $\vec{n}_1=(x_1, y_1, z_1)$, the first slant range $R_1$ can be expressed as $R_1=\|\vec{u}-\vec{n}_1\|=((x_1-x_U)^2+(y_1-y_U)^2+(z_1-z_U)^2)^{1/2}$, where $\vec{u}-\vec{n}_1$ is a first relative position vector that represents the object position u relative to the first radar position $\vec{n}_1$. Denoting a second radar position of the second radar node 100(2) by $\vec{n}_2=(x_2, y_2, z_2)$, the second slant range $R_2$ can be expressed as $R_2=\|\vec{u}-\vec{n}_2\|=((x_2-x_U)^2+(y_2-y_U)^2+(z_2-z_U)^2)^{1/2}$, where $\vec{u}-\vec{n}_2$ is a second relative position vector that represents the object position $\vec{u}$ relative to the second radar position $\vec{n}_2$. As shown in FIG. 2, the first radar node 100(1) measures a first elevation angle $\theta_1$ between the first relative position vector $\vec{u}-\vec{n}_1$ and the horizontal x-y plane. Similarly, the second radar node 100(2) measures a second elevation angle $\theta_2$ between the second relative position vector $\vec{u}-\vec{n}_2$ and the horizontal x-y plane. The first radar node 100(1) then calculates the height $h=R_1 \sin \theta_1$ of the UAS 130. The second radar node 100(2) may similarly calculate the height $h=R_2 \sin \theta_2$. To account for the vertical displacement of the first radar node 100(1) above the ground 210, the first radar node 100(1) may add an offset $z_0$ to h to obtain the vertical coordinate $z_U$ of the UAS 130 above the ground 210 (i.e., z=0 at the ground 210). The first radar node 100(1) may also project the first relative position vector $\vec{u}-\vec{n}_1$ onto the horizontal x-y plane to obtain a first horizontal range $r_1=\|\vec{u}-\vec{n}_1\| \cos \theta_1$. The second radar node 100(1) may similarly project the second relative position vector $\vec{u}-\vec{n}_2$ onto the horizontal x-y plane to obtain a second horizontal range $r_2=\|\vec{u}-\vec{n}_2\| \cos \theta_2$.

Figure 3:
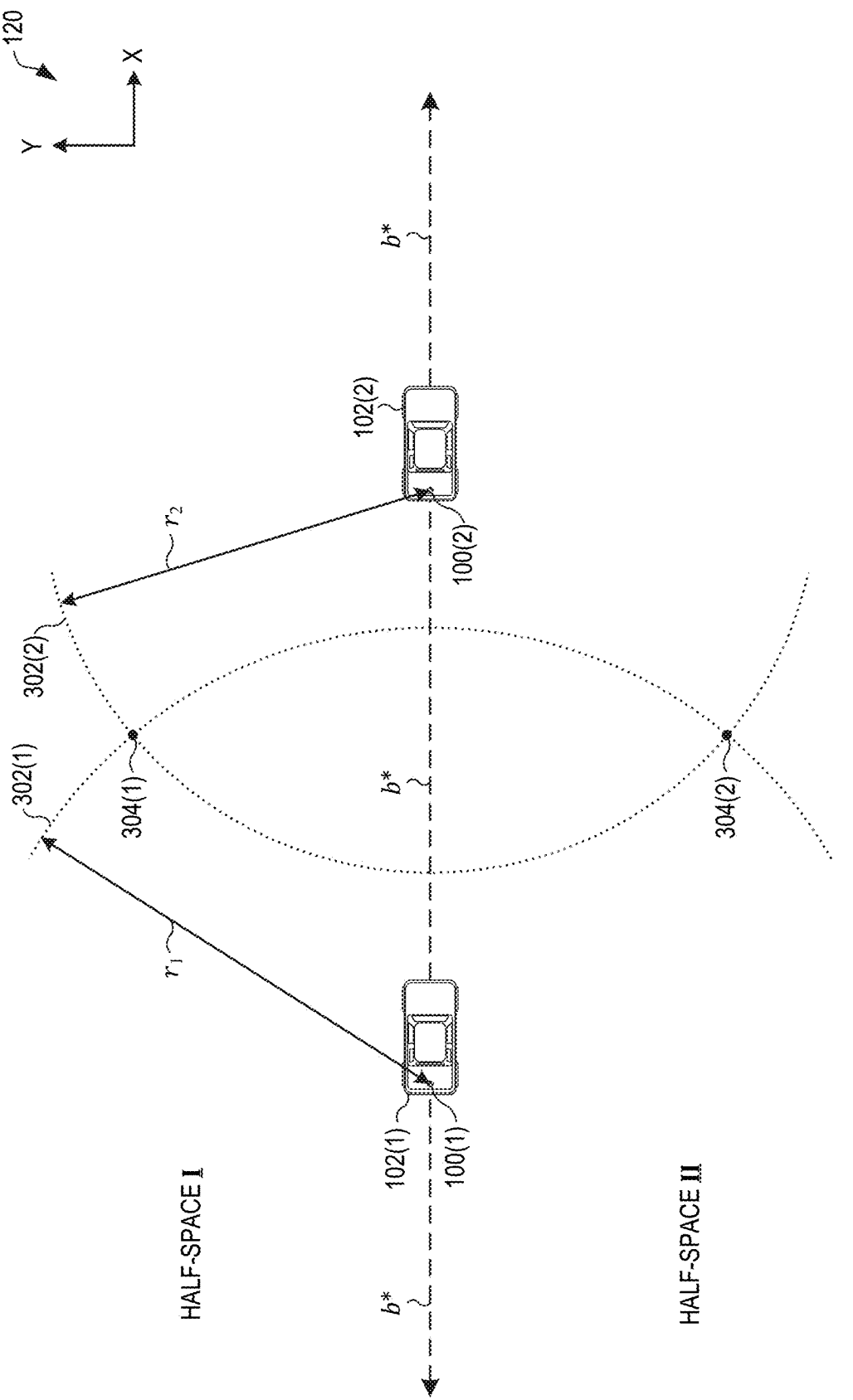
FIG. 3 illustrates how the first radar node of FIGS. 1 and 2 can determine the position of the UAS in the horizontal x-y plane, in an embodiment.

FIG. 3 illustrates how the first radar node 100(1) can determine the position of the UAS 130 in the horizontal x-y plane. A first locus of points forms a first circle 302(1) of radius $r_1$ that is centered at $(x_1,y_1)$, and a second locus of points forms a second circle 302(2) of radius $r_2$ that is centered at $(x_2,y_2)$. The first and second circles 302(1), 302(2) lie flat in the x-y plane defined by $z=z_1=z_2$, and therefore intersect at first and second points 304(1), 304(2). Each of the first and second points 304(1), 304(2) represents one ground-track solution for the ground-track coordinates $x_U$ and $y_U$ of the UAS 130. One of the first and second points 304(1), 304(2) represents a correct ground-track solution that correctly indicates the position of the UAS 130, while the other represents an ambiguous solution that incorrectly indicates the object position.

The first and second points 304(1), 304(2) are shown in FIG. 3 as lying on opposite sides of an extended baseline b* that represents the extension of the baseline b in the depicted x-y plane. The extended baseline b* may also be defined by the intersection of a vertical baseline plane and the depicted x-y plane. Here, "vertical" means that the baseline plane extends vertically in both the +z and −z directions. This baseline plane intersects the first and second radar positions $\vec{n}_1$, $\vec{n}_2$ and therefore defines a boundary between three-dimensional half spaces I and II. Thus, one of the first and second points 304(1), 304(2) is located in the half space I (i.e., above the extended baseline b* in the y direction in FIG. 3), and the other of the first and second points 304(1), 304(2) is located in the half space II (i.e., below the extended baseline b* in the y direction in FIG. 3).

Figure 4:
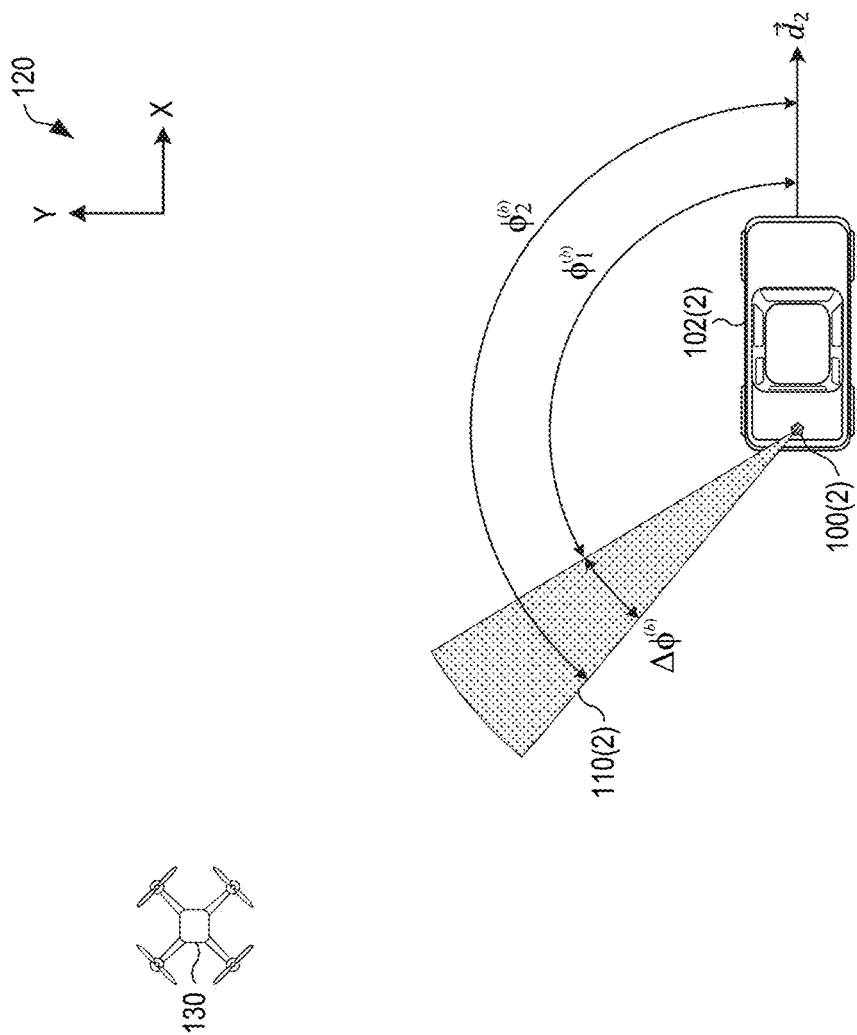
FIG. 4 illustrates how the first radar node of FIGS. 1-3 may advantageously use additional azimuthal information to identify in which half space the UAS is located, in an embodiment.
Figure 4:
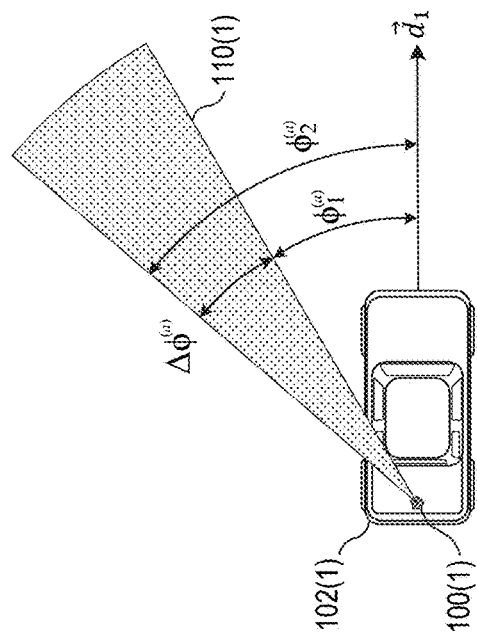

FIG. 4 illustrates how the first radar node 100(1) may advantageously use additional azimuthal information to identify in which half space (I or II) the UAS 130 is located, and therefore which of the first and second points 304(1), 304(2) is the correct ground-track solution. The half space in which the UAS 130 is located is referred to as the object half space. Thus, in the example of FIGS. 1-3, the object half space is the half space I. When the first radar node 100(1) receives the first reflection 112(1) from the UAS 130, the first radar node 100(1) correlates the presence of the UAS 130 with a first azimuth field-of-view (FOV) $\Phi^{(a)}=[\phi_1^{(a)}, \phi_2^{(a)}]$ within which the first radar node 100(1) transmitted the first radar beam 110(1). For example, the first radar node 100(1) in FIG. 4 receives the first reflection 112(1) in response to the first radar beam 110(1) being transmitted between azimuthal bounds $\phi_1^{(a)}$ and $\phi_2^{(a)}$. Azimuthal angles $\phi^{(a)}$ for the first radar node 100(1) may be defined relative to a first local azimuthal reference direction (see local azimuthal reference 710 in FIG. 7), which is taken to be the first direction $\vec{d}_1$ in the examples of FIGS. 1-4. Alternatively, the azimuthal angles $\phi^{(a)}$ may be defined relative to a global reference direction (e.g., true north, magnetic north, grid north, etc.).

The first radar beam 110(1) may be a pencil-like beam that the first radar node 100(1) electronically steers between the azimuthal bounds $\phi_1^{(a)}$ and $\phi_2^{(a)}$. Alternatively, the first radar beam 110(1) may be a fan-shaped beam with an azimuthal beamwidth of $\Delta\phi^{(a)}=\phi_2^{(a)}-\phi_1^{(a)}$ and centered at $(\phi_2^{(a)}+\phi_1^{(a)})/2$. In either case, the first radar node 100(1) may also electronically steer the first radar beam 110(1) through a first elevation FOV to measure the first elevation angle $\theta_1$. The second radar beam 110(2) may be similarly shaped and electronically steered.

The second radar node 100(2) receives the reflection 112(2) from the UAS 130 to correlate the presence of the UAS 130 with a second azimuth FOV $\Phi^{(b)}=[\phi_1^{(b)}, \phi_2^{(b)}]$ within which the second radar node 100(2) transmitted the second radar beam 110(2). Azimuthal angles $\phi^{(b)}$ for the second radar node 100(2) may be defined relative to a second local azimuthal reference direction, which is taken to be the second direction $\vec{d}_2$ in the example of FIGS. 1-4. Alternatively, azimuthal angles for the second radar node 100(2) may be defined relative to a global reference direction. Different first and second local azimuthal reference directions may be used without departing from the scope hereof. The second radar node 100(2) wirelessly transmits the azimuthal bounds $\phi_1^{(b)}$ and $\phi_2^{(b)}$ to the first radar node 100(1) so that the first radar node 100(1) knows the second azimuth FOV $\Phi^{(b)}$.

To identify on which side of the extended baseline b* the UAS 130 is located, the first radar node 100(1) determines a baseline vector $\vec{b}$ between the first radar position $\vec{n}_1=(x_1, y_1, z_1)$ and the second radar position $\vec{n}_2=(x_2, y_2, z_2)$. The magnitude of the baseline vector $\vec{b}$ is shown in FIGS. 1 and 2 as $b=\|\vec{b}\|$. The first radar node 100(1) may determine the first radar position $\vec{n}_1$ using any positioning technique known in the art. For example, the first radar node 100(1) may include a receiver that determines the first radar position $\vec{n}_1$ via a global navigation satellite system (e.g., GPS, Galileo, GLONASS, BeiDou, etc.). The first radar node 100(1) may additionally or alternatively include a receiver for determining the first radar position $\vec{n}_1$ via multilateration, multiangulation, or radio-direction finding. The second radar node 100(2) may similarly determine, and wirelessly transmit, the second radar position $\vec{n}_2$ to the first radar node 100(1), which may then calculate the baseline vector as $\vec{b}=\vec{n}_2-\vec{n}_1$. In other embodiments, the first radar node 100(1) includes an additional radar or lidar system to directly measure the second radar position $\vec{n}_2$ relative to the first radar position $\vec{n}_1$ without the second radar node 100(2) having to determine and wirelessly transmit the second radar position $\vec{n}_2$.

Figure 5:
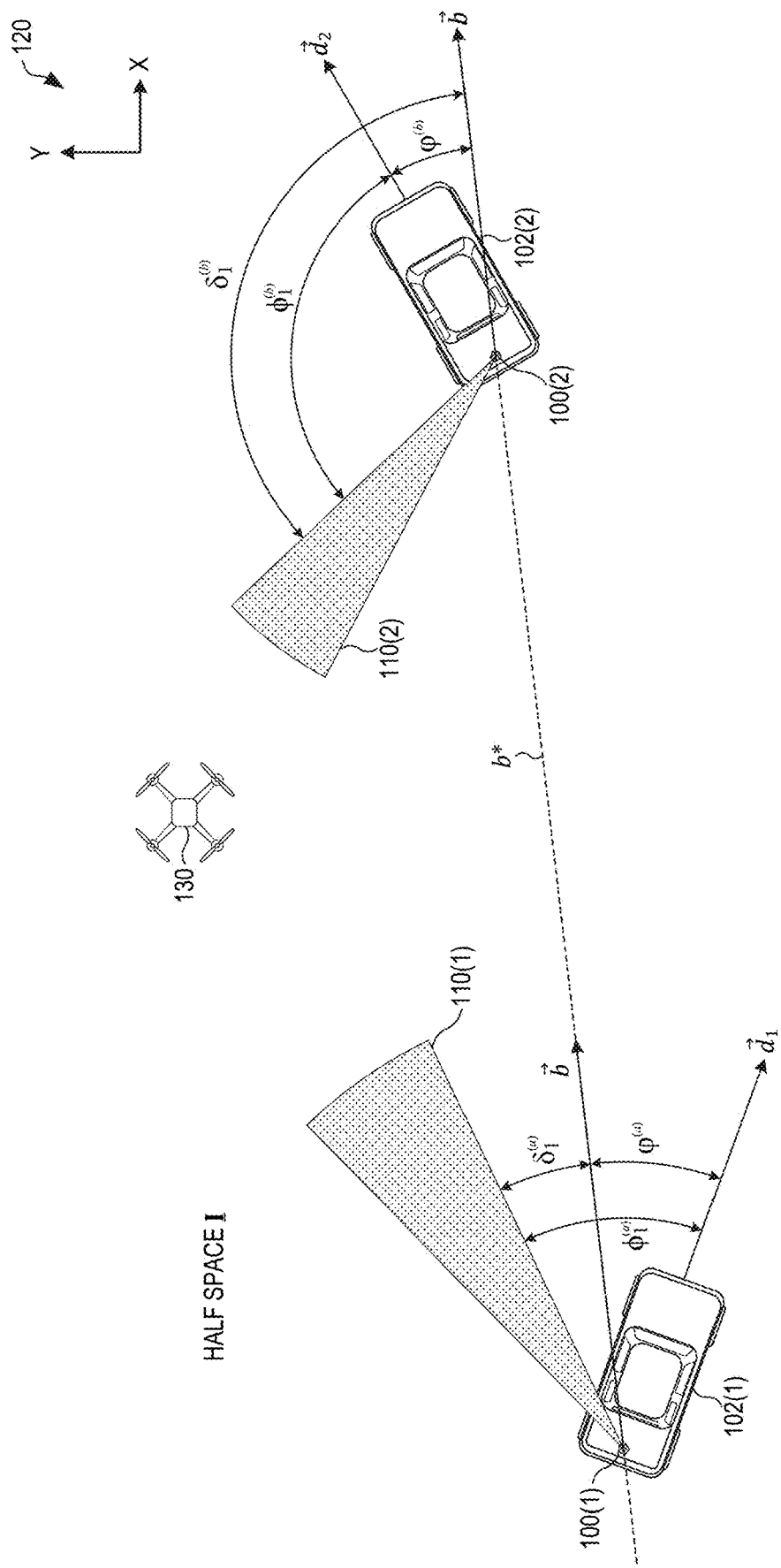
FIG. 5 illustrates the first and second radar nodes of FIGS. 1-4 cooperating to locate the UAS when first and second vehicles do not move along the same straight line, in an embodiment.

The first radar node 100(1) determines the first and second azimuth FOVs $\Phi^{(a)}$, $\Phi^{(b)}$ relative to the baseline vector $\vec{b}$. In the example of FIGS. 1-4, the baseline vector $\vec{b}$ is parallel to the first and second directions $\vec{d}_1$, $\vec{d}_2$, and therefore the azimuth FOVs $\Phi^{(a)}$, $\Phi^{(b)}$ are unchanged when expressed relative to the baseline vector $\vec{b}$. FIG. 5 illustrates the more general case where the baseline vector $\vec{b}$ is not parallel to the first and second directions $\vec{d}_1$, $\vec{d}_2$.

In FIG. 4, the first radar node 100(1) determines that the azimuthal bounds $\phi_2^{(a)}$ and $\phi_1^{(a)}$ are both positive, and that therefore the first azimuth FOV $\Phi^{(a)}$ opens entirely toward the half space I. Here, "opens" means that for each angle $\phi$ within the first azimuth FOV $\phi^{(a)}$, a line segment starting at the position of the first radar node 100(1), and extending away from the first radar node 100(1) to form the angle $\phi$, will extend into the half space I. The first radar node 100(1) also determines that the azimuthal bounds $\phi_2^{(b)}$ and $\phi_1^{(b)}$ are both positive, and that the second azimuth FOV $\Phi^{(b)}$ opens entirely into the half space I. Since $\phi_1^{(a)}$, $\phi_2^{(a)}$, $\phi_1^{(b)}$, and $\phi_2^{(b)}$ are all positive, the first radar node 100(1) identifies the half space I as the object half space. In this case, the point 304(1) in FIG. 3 is the correct ground-track solution and the point 304(2) is the ambiguous solution. If the first radar node 100(1) had determined that $\phi_1^{(a)}$, $\phi_2^{(a)}$, $\phi_1^{(b)}$, and $\phi_2^{(b)}$ were all negative, then the first radar node 100(1) would have identified the half space II as the object half space, in which case the point 304(2) would have been the correct ground-track solution and the point 304(1) would have been the ambiguous solution.

In some embodiments, the first radar node 100(1) identifies the object half space after calculating both the first and second points 304(1), 304(2). The first radar node 100(1) then identifies which one of the first and second points 304(1), 304(2) lies within the object half space, and returns the identified point 304 as the correct ground-track solution. The point 304 corresponding to the ambiguous solution may be discarded. In other embodiments, the first radar node 100(1) first identifies the object half space, and then directly calculates only the one of the first and second points 304(1), 304(2) that is the correct ground-track solution. In this case, the ambiguous solution does not need to be calculated and discarded. In either case, the first radar node 100(1) may combine the correct ground-track solution (i.e., the coordinates $x_U$ and $y_U$ of the UAS 130) with the coordinate $z_U$ of the UAS 130 to obtain the object position $\vec{u}=(x_U, y_U, z_U)$ of the UAS 130 in all three spatial dimensions. The first radar node 100(1) may wirelessly transmit the object position $\vec{u}$ back to the second radar node 100(2).

FIG. 5 illustrates the first and second radar nodes 100(1), 100(2) cooperating to locate the UAS 130 when the first and second vehicles 102(1), 102(2) do not move along the same straight line. Equivalently, one or both of the first and second directions $\vec{d}_1$, $\vec{d}_2$ change while the first and second radar nodes 100(1), 100(2) track the UAS 130. The situation depicted in FIG. 5 differs from that shown in FIGS. 1-4 in that the first and second local azimuthal reference directions are not parallel to the baseline vector $\vec{b}$. This may occur, for example, when the first and second vehicles 102(1), 102(2) move along a curve (e.g., while turning), in which case the first and second directions $\vec{d}_1$, $\vec{d}_2$ are not parallel to each other. The situation may also occur when the first and second vehicles 102(1), 102(2) are at rest, but not pointing in the same direction.

One or both of the first radar node 100(1) and the first vehicle 102(1) may be equipped with a direction sensor (e.g., see direction sensor 816 in FIG. 8) that measures the first direction $\vec{d}_1$ as a bearing (or azimuth) relative to a global reference direction. For example, the direction sensor may use a compass to measure the first direction $\vec{d}_1$ relative to magnetic north (e.g., as an angle between −180° and +180°). Alternatively, the first vehicle 102(1) may be equipped with a satellite-navigation receiver that uses two spatially separated antennae to determine the first direction $\vec{d}_1$ relative to true north (or geodetic north). Alternatively, the direction sensor may be a radio-direction finder that determines the first direction $\vec{d}_1$ relative to a radio source. Alternatively, the direction sensor may be an inertial measurement unit that determines the first direction $\vec{d}_1$ via dead reckoning. Another global reference direction (e.g., grid north) may be used without departing from the scope hereof. Another technique to determine the first direction $\vec{d}_1$ may be used without departing from the scope hereof.

The first radar node 100(1) uses the first direction $\vec{d}_1$ and baseline vector $\vec{b}$ to determine a first azimuthal offset $\varphi^{(a)}$. The first radar node 100(1) subtracts the first azimuthal offset $\varphi^{(a)}$ from the azimuthal bound $\phi_1^{(a)}$ to obtain a first baseline-reference azimuthal bound $\delta_1^{(a)} = \phi_1^{(a)} - \varphi^{(a)}$. Although not shown in FIG. 5, the first radar node 100(1) similarly subtracts the first azimuthal offset $\varphi^{(a)}$ from the azimuthal bound $\phi_2^{(a)}$ to obtain a second baseline-reference azimuthal bound $\delta_2^{(a)} = \phi_2^{(a)} - \varphi^{(a)}$. If $\delta_1^{(a)}$ and $\delta_2^{(a)}$ are both positive, then the first azimuth FOV $\Phi^{(a)}$ opens entirely toward the half space I. If $\delta_1^{(a)}$ and $\delta_2^{(a)}$ are both negative, then the first azimuth FOV $\Phi^{(a)}$ opens entirely toward the half space II.

One or both of the second radar node 100(2) and second vehicle 102(2) may be similarly equipped with a direction sensor that measures the second direction $\vec{d}_2$ as a bearing (or azimuth) relative to the global reference direction. The second radar node 100(2) may then wirelessly transmit the second direction $\vec{d}_2$ to the first radar node 100(1), which uses the second direction $\vec{d}_2$ and baseline vector $\vec{b}$ to determine a second azimuthal offset $\varphi^{(b)}$. The first radar node 100(1) subtracts the second azimuthal offset $\varphi^{(b)}$ from the azimuthal bounds $\phi_1^{(b)}$ and $\phi_2^{(b)}$ to obtain third and fourth baseline-reference azimuthal bounds $\delta_1^{(b)} = \phi_1^{(b)} - \varphi^{(b)}$ and $\delta_2^{(b)} = \phi_2^{(b)} - \varphi^{(b)}$, respectively. If $\delta_1^{(b)}$ and $\delta_2^{(b)}$ are both positive, then the second azimuth FOV $\Phi^{(b)}$ opens entirely toward the half space I. If $\delta_1^{(b)}$ and $\delta_2^{(b)}$ are both negative, then the first azimuth FOV $\Phi^{(b)}$ opens entirely toward the half space II.

In FIG. 5, all four baseline-reference azimuthal bounds $\delta_1^{(a)}$, $\delta_2^{(a)}$, $\delta_1^{(b)}$, and $\delta_2^{(b)}$ are positive, and therefore the first radar node 100(1) identifies the half space I as the object half space. If the first radar node 100(1) had determined that all four baseline-reference azimuthal bounds $\delta_1^{(a)}$, $\delta_2^{(a)}$, $\delta_1^{(b)}$, and $\delta_2^{(b)}$ were negative, then the first radar node 100(1) would have identified the half space II as the object half space.

Figure 6:
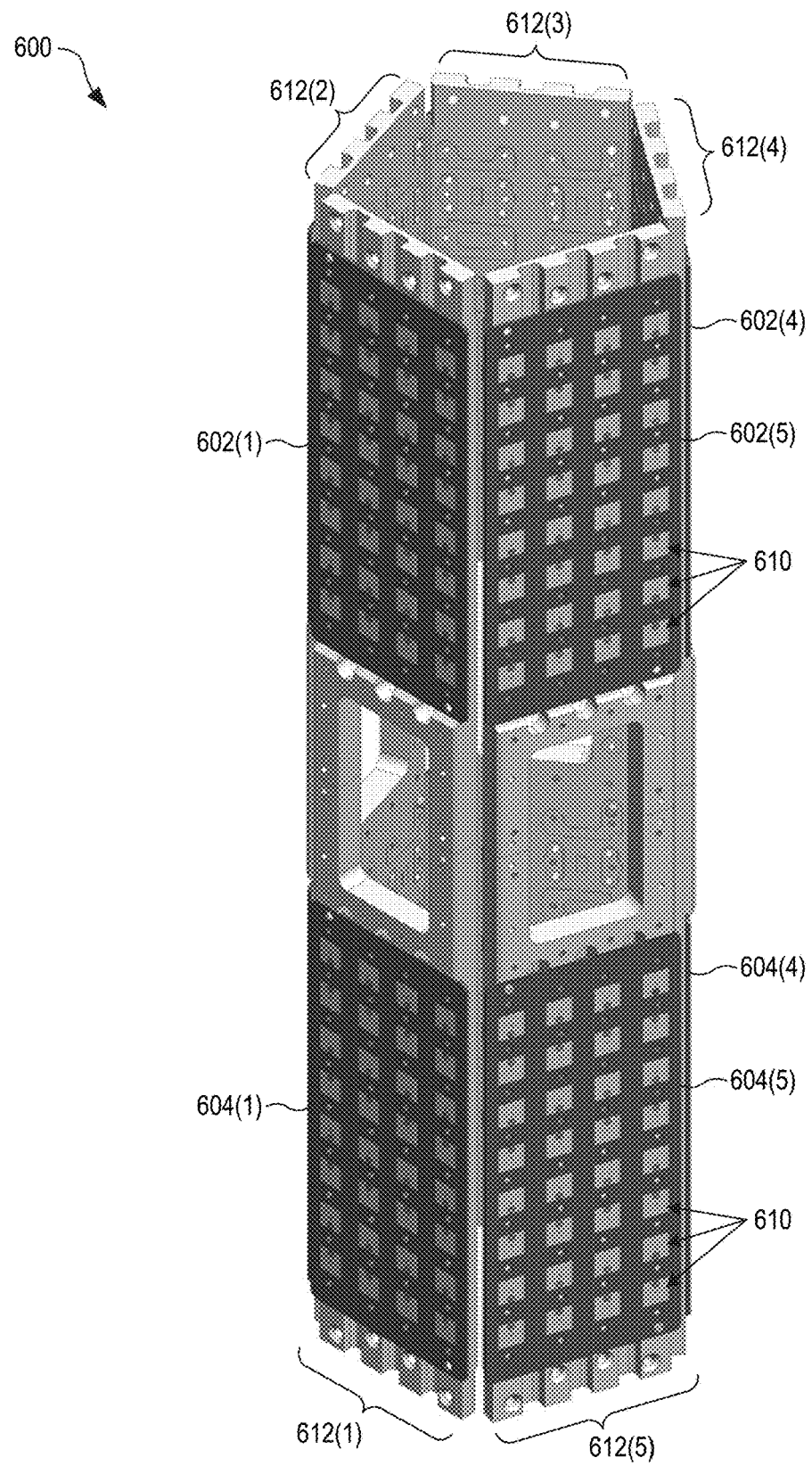
FIGS. 6 and 7 are isometric and top views, respectively, of an antenna structure that may be used with each of the first and second radar nodes of FIGS. 1-5, in an embodiment.
Figure 7:
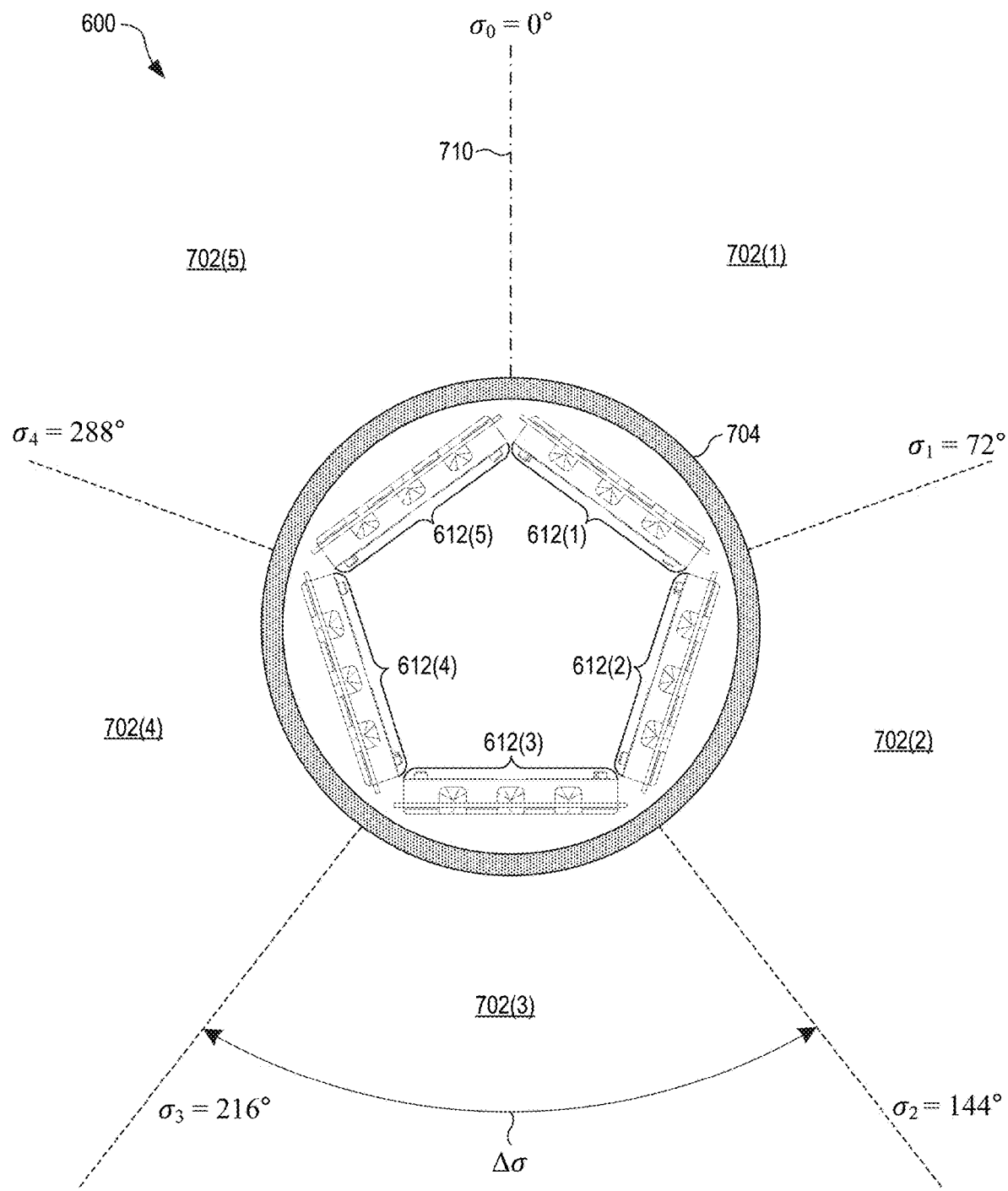

FIGS. 6 and 7 are isometric and top views, respectively, of an antenna structure 600 that may be used with each of the first and second radar nodes 100(1), 100(2). The antenna structure 600 has a plurality of n rectangular panels 612 arranged as a right n-gonal prism, shown in FIGS. 6 and 7 as a right pentagonal prism with five panels 612 (i.e., n=5). However, the antenna structure 600 may have a different number n of rectangular panels 612 arranged as a right n-gonal prism (e.g., hexagonal, octagonal, square, etc.) without departing from the scope hereof. The antenna structure 600 may alternatively have only two rectangular panels 612 placed back-to-back such that each of the two rectangular panels 612 covers an azimuth FOV of 180°. Alternatively, the antenna structure 600 may be shaped as a cylinder, wherein the panels 612 are curved. A cylindrical radome 704 may surround and protect the rectangular panels 612.

Each rectangular panel 612 has one transmitting antenna array 602 and one receiving antenna array 604. Each antenna array 602, 604 has a plurality of antenna elements 610. In the example of FIGS. 6 and 7, each antenna array 602, 604 is a two-dimensional array of 32 antenna elements 610 arranged in 8 rows and 4 columns. However, each antenna array 602, 604 may have a different number of antenna elements 610, rows, or columns without departing from the scope hereof. For example, each antenna array 602, 604 may have only one antenna element 610. Furthermore, the number of antenna elements 610, rows, and columns in each transmitting antenna array 602 may be different from that of the corresponding receiving antenna array 604. In some embodiments, each antenna array 602, 604 is a one-dimensional array of antenna elements 610 arranged as a single column. In these embodiments, several neighboring transmitting antenna arrays 602 may be used simultaneously to transmit, and several neighboring receiving antenna arrays 604 may be used simultaneously to receive. In one embodiment, the antenna arrays 602, 604 are formed on one side of a flexible circuit board that is rolled into a cylinder. In this embodiment, each antenna element 610 is curved to conform to the outer cylindrical surface of the rolled circuit board.

By arranging the rectangular panels 612 as a right polygonal prism, the antenna structure 600 can advantageously transmit and receive radar beams (e.g., the radar beams 110 in FIGS. 1, 2, 4, and 5) with full azimuthal coverage. Each of the rectangular panels 612 faces a corresponding azimuthal sector 702 with an azimuthal span $\Delta\sigma = 360°/n$, or $\Delta\sigma = 72°$ for the example of n=5 shown in FIGS. 6 and 7. All azimuthal angles are measured relative to a local azimuthal reference 710, which is located between the rectangular panels 612(1) and 612(5) in the example of FIGS. 6 and 7. However, another azimuthal direction may be used as the local azimuthal reference 710 without departing from the scope hereof Relative to the local azimuthal reference 710, each azimuthal sector 702(i) is bounded by a lower sector bound $\sigma_{i-1}=(i-1)/n\times 360°$ and an upper sector bound $\sigma_i=i/n\times 360°$, where i is an integer running from 1 to n. Each sector bound σ is an azimuthal angle. Note that the upper sector bound for the azimuthal sector 702(*i*) equals the lower sector bound for the azimuthal sector 702(*i*+1).

When one of the rectangular panels 612(*i*) transmits a radar beam within its corresponding azimuthal sector 702(*i*), and receives a corresponding reflection indicating the presence of the UAS 130, the radar node 100 uses the sector bounds $\sigma_{i-1}$ and $\sigma_i$ as the azimuthal bounds $\phi_1$ and $\phi_2$. The radar node 100 may then process the azimuthal bounds $\phi_1$ and $\phi_2$, as described above, to determine if the azimuthal sector 702(*i*) opens into the half space I or the half space II. Alternatively, the radar node 100 may wirelessly transmit the sector bounds $\sigma_{i-1}$ and $\sigma_i$ to another radar node 100 that determines, based on the sector bounds $\sigma_{i-1}$ and $\sigma_i$, if the azimuthal sector 702(*i*) opens into the half space I or the half space II.

In FIG. 6, the one transmitting antenna array 602 is positioned above the one receiving antenna array 604 on each rectangular panel 612 to advantageously increase isolation between the antenna arrays 602, 604. Alternatively, the one transmitting antenna array 602 may be placed below the one receiving antenna array 604. In other embodiments, each rectangular panel 612 includes only one antenna array that both transmits and receives. The one antenna array may have only one antenna element, or more than one antenna element. In some of these embodiments, the one antenna array both transmits and receives simultaneously. In other of these embodiments, the one antenna array alternates between transmitting and receiving, wherein the one antenna array is either transmitting or receiving at any instant.

Each of the radar nodes 100(1), 100(2) uses the geometry of the rectangular panels 612 to bound the azimuth FOV (i.e., set upper and lower limits on the azimuthal angle) of the UAS 130, and therefore does not need to explicitly measure an azimuthal angle of the UAS 130 (or a azimuth FOV subtended by the UAS 130). However, one or both of the radar nodes 100(1), 100(2) may be configured to explicitly measure an azimuthal angle of the UAS 130. For example, each radar node 100 may be implemented as a monopulse radar system that transmits a monopulse radar beam with an azimuthal angular beamwidth that is less than the azimuthal span Δσ. Using one transmitting antenna array 602(*i*), the radar node 100 may electronically steer the monopulse radar beam within the corresponding sector bounds $\sigma_{i-1}$ and $\sigma_i$, thereby transmitting radiation at all azimuthal angles of the sector 702(*i*). The radar node 100 may then process the reflection received by the corresponding receiving antenna array 604(*i*) to measure a center azimuthal angle of the UAS 130 (e.g., via sum and difference patterns). The center azimuthal angle may then be processed similarly to the azimuthal bounds $\phi_1^{(a)}$ and $\phi_2^{(a)}$ (e.g., transformed into a baseline-referenced azimuthal angle) to determine which of the half spaces I and II is the object half space (e.g., based on the sign of the baseline-referenced azimuthal angle).

Alternatively, the radar node 100 may process the reflection to measure an azimuth FOV subtended by the UAS 130. For example, this FOV may be determined by an uncertainty in the measured center azimuthal angle (which is typically less than the azimuthal angular beamwidth of the transmitted monopulse radar beam). Given sufficient signal-to-noise ratio of the detected reflection, the measured azimuth FOV may be smaller than the azimuthal span Δσ that is set by the geometry of the rectangular panels 612. When this occurs, the smaller azimuth FOV provides tighter bounds on the object location of the UAS 130 that may then be processed similarly to the azimuthal boundaries $\phi_1^{(a)}$ and $\phi_2^{(a)}$ to determine which of the half spaces I and II is the object half space. One advantage of using monopulse radar techniques with the antenna structure 600 is that the tighter bounds can be used to identify the object half space with greater certainty.

In certain embodiments, the radar node 100 implements monopulse radar techniques to measure an elevation angle θ of the UAS 130 (e.g., see elevation angles $\theta_1$ and $\theta_2$ in FIG. 2). Using one transmitting antenna array 602(*i*), the radar node 100 may electronically steer the monopulse radar beam across an elevation FOV, and process the resulting reflection (e.g., via sum and difference patterns) to determine a center elevation angle of the UAS 130. The elevation FOV may be determined by an elevation angular beamwidth of the transmitted radar beam, which in turn depends on the number and configuration of the antenna elements 610 of the transmitting antenna array 602. For example, the transmitted radar beam may have a main lobe with an elevation angular beamwidth of 15°, wherein the radar node 100 steers the transmitted radar beam between elevation angles of 0° and 60°.

In some of these embodiments, the radar node 100 implements monopulse radar only to measure the elevation angle θ. In these embodiments, the transmitted radar beam may be shaped as a fan beam that fills the azimuthal span Δσ without the need to electronically steer the radar beam in azimuth. In other embodiments, the radar node 100 implements monopulse radar to measure both azimuthal and elevation angles of the UAS 130. In these embodiments, the transmitted radar beam may be shaped as a pencil beam that is scanned in both azimuth and elevation. More generally, the radar node 100 may measure the azimuth and elevation angles of the UAS 130 using any combination of monopulse radar, conical scanning, and lobe switching. The radar node 100 may measure one or both of the azimuth and elevation angles using another technique without departing from the scope hereof.

In some embodiments, each radar node 100 either additionally or alternatively measures a speed or velocity of the UAS 130. For example, each radar node 100 may implement frequency-modulated continuous wave (FMCW) radar to measure, via the Doppler effect, a velocity of the UAS 130 along the radial direction. In this case, the first and second radar nodes 100(1), 100(2) can cooperate to identify both components of a ground-track velocity vector of the UAS 130. For example, the first radar node 100(1) measures a first velocity of the UAS 130, and the second radar node 100(2) measures a second velocity of the UAS 130. The second radar node 100(2) wirelessly transmits the second velocity to the first radar node 100(1), which determines movement of the UAS 130 based on the first and second velocities. The first and second radar nodes 100(1), 100(2) may also receive respectively first and second vehicular velocities of the first and second vehicles 102(1), 102(2). The second radar node 100(2) may wirelessly transmit the second vehicular velocity to the first radar node 100(1), which then additionally uses the first and second vehicular velocities to determine the movement of the UAS 130 (e.g., ground speed).

Each radar node 100 may implement another type of Doppler radar (e.g., continuous-wave, pulsed Doppler, coherent pulsed Doppler, etc.) without departing from the scope hereof. It should be appreciated that velocity measurements can be implemented independent of angular measurements. Therefore, in some embodiments the radar node 100 implements both FMCW radar (or another type of Doppler radar) and monopulse radar (or another type of angular measurement). In other embodiments, the radar node 100 implements only one of FMCW radar and monopulse radar. In yet other embodiments, the radar node 100 implement neither speed/velocity measurements nor explicit azimuthal measurements.

When two or more radar nodes 100 operate simultaneously, a first radar node 100 may detect a reflection of a radar beam transmitted by a second radar node 100 (i.e., bistatic radar). To ensure that each radar node 100 can identify the reflection of its own transmitted radar beam, the radar nodes 100 may be configured to operate in one of several frequency bands. In this case, several radar nodes 100 can communicate with other to prevent more than one radar node 100 from using the same band. Alternatively, multiple radar nodes 100 can cooperate to use time-division multiplexing in which each radar node 100 is assigned a unique time slot within which it transmits and receives (and no other radar node 100 transmits and receives). Alternatively, the radar nodes 100 can use orthogonal coding on the transmitted radar beams.

Figure 8:
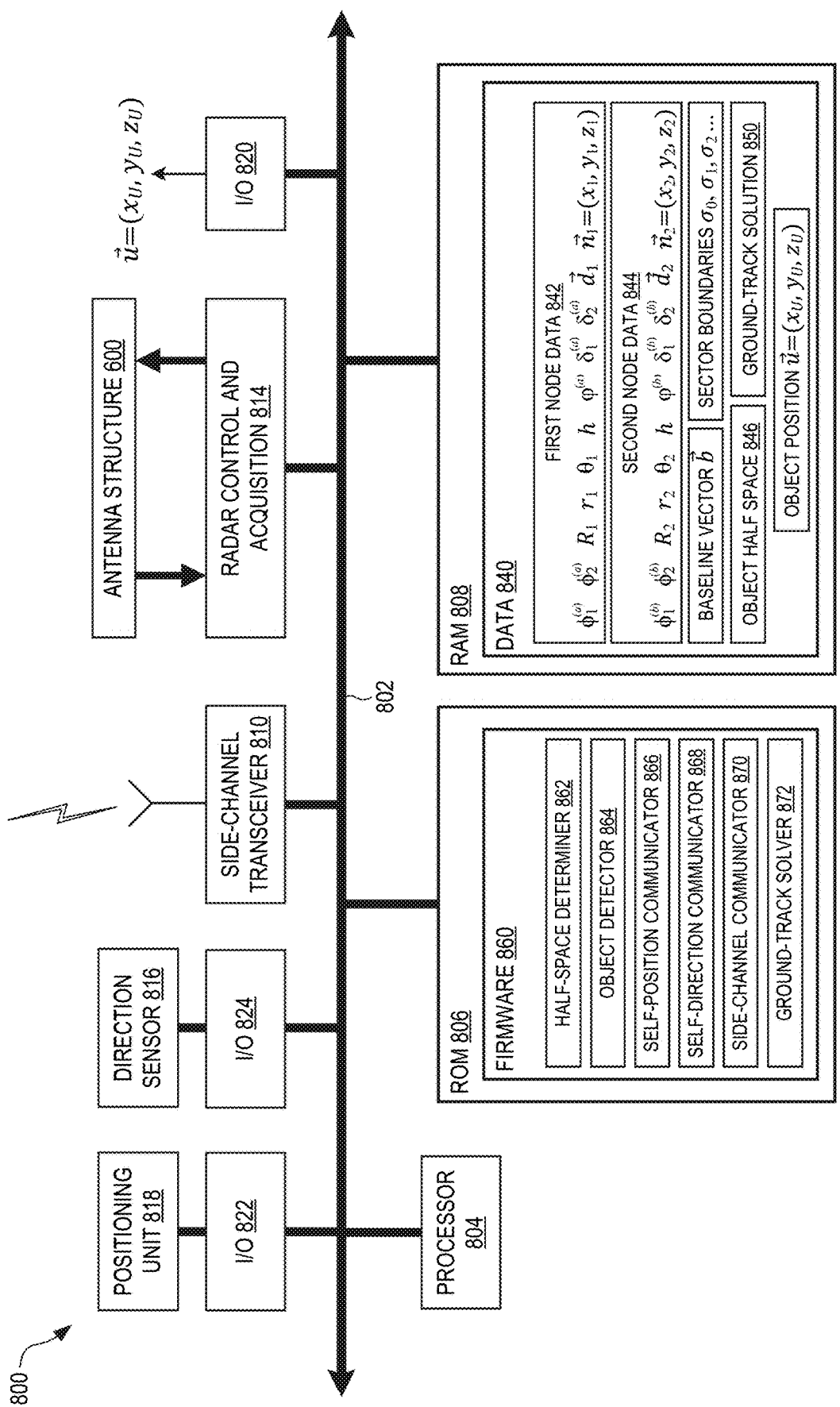
FIG. 8 is a functional diagram of an electronic radar-tracking module that may be used with the antenna structure of FIGS. 6 and 7 to create each of the first and second radar nodes of FIGS. 1-5, in an embodiment.

FIG. 8 is a functional diagram of an electronic radar-tracking module 800 that may be used with the antenna structure 600 of FIGS. 6 and 7 to create each of the first and second radar nodes 100(1), 100(2). The radar-tracking module 800 may be implemented as an embedded system located near the antenna structure 600. The radar-tracking module 800 includes a read-only memory (ROM) 806 and a random-access memory (RAM) 808 that communicate with a processor 804 over a system bus 802. Also connected to the system bus 802 is an input/output (I/O) block 822 that interfaces with a positioning unit 812, an I/O block 824 that interfaces with a direction sensor 816, a side-channel transceiver 810 for wirelessly communication, a radar control and acquisition module 814 that interfaces with the antenna structure 600 of FIGS. 6 and 7, and an I/O block 820 for interfacing with an external peripheral device. Additional components may be connected to the system bus 802 without departing from the scope hereof.

The ROM 806 stores machine-readable instructions (shown as firmware 860 in FIG. 8) that, when executed by the processor 804, control the radar-tracking module 800 to implement the functionality described herein. In FIG. 8, the firmware 860 includes a half-space determiner 862, an object detector 864, a self-position communicator 866, a self-direction communicator 868, a side-channel communicator 870, and a ground-track solver 872. However, the ROM 806 may store additional machine-readable instructions (e.g., operating system instructions, I/O instructions, etc.) without departing from the scope hereof. The ROM 806 may be implemented using non-volatile memory, such as flash memory, NVRAM, FRAM, MRAM, EEPROM, EPROM, or a combination thereof.

The RAM 808 stores data 840 used by the processor 804 when executing the firmware 860. In FIG. 8, the data 840 includes first node data 842, second node data 844, the baseline vector $\vec{b}$, sector boundaries $\sigma_i$, an object half space 846, a ground-track solution 850, and the object position $\vec{u}$ of the UAS 130. However, the RAM 808 may store additional data 840 without departing from the scope hereof (e.g., a velocity of the UAS 130 when implementing FMCW radar). The RAM 808 may be implemented using volatile memory, such as DRAM, SRAM, or a combination thereof.

The object detector 864, when executed by the processor 804, controls the radar control and acquisition module 814 to (i) drive the antenna structure 600 to transmit the first radar beam 110(1), and (ii) process the first reflection 112(1) received by the antenna structure 600 to measure the first slant range $R_1$ and first elevation angle $\theta_1$ of the UAS 130, and to determine the sector i (where $1 \leq i \leq n$) within which the UAS 130 is detected. The radar control and acquisition module 814 implements all radar functionality for the first radar node 100(1), including beamsteering, timing, waveform generation, digitization, monopulse beam generation and signal processing (when monopulse radar is implemented), FMCW signal generation and processing (when FMCW is implemented), and so on. The radar control and acquisition module 814 transmits $R_1$, $\theta_1$, and i over the system bus 802 to the RAM 808, where the first slant range $R_1$ and elevation angle $\theta_1$ are stored in the first node data 842. The object detector 864 further controls the radar-tracking module 800 to look up the two sector boundaries $\sigma_{i-1}$ and $\sigma_i$ for the sector i, and store these two sector boundaries as the azimuthal boundaries $\phi_1^{(a)}$ and $\phi_2^{(a)}$ of the first node data 842. The object detector 864 may also control the radar-tracking module 800 to calculate, and store in the first node data 842, the first horizontal range $r_1$ and height h.

The self-position communicator 866, when executed by the processor 804, controls the radar-tracking module 800 to obtain the first radar position $\vec{n}_1 = (x_1, y_1, z_1)$ from the positioning unit 818. The I/O block 822 receives $\vec{n}_1$ from the positioning unit 818 (e.g., in response to a query sent to the positioning unit 818), and transmits $\vec{n}_1$ over the system bus 802 to the RAM 808 for storage in the first node data 842. The positioning unit 818 may be a GPS receiver or similar receiver that implements satellite-based positioning. The positioning unit 818 may also include an inertial measurement unit that uses dead-reckoning to track $\vec{n}_1$ between periodic updates from the GPS receiver (or when GPS signals are unavailable).

The self-direction communicator 868, when executed by the processor 804, controls the radar-tracking module 800 to receive the first direction $\vec{d}_1$ from the direction sensor 816. The I/O block 824 receives $\vec{d}_1$ from the direction sensor 816 (e.g., in response to a query sent to the direction sensor 816), and transmits $\vec{d}_1$ over the system bus 802 to the RAM 808 for storage in the first node data 842. In some embodiments, the direction sensor 816 is a magnetic compass or gyrocompass. In some embodiments, the positioning unit 818 combines an inertial measurement unit with a GPS receiver connected to two spatially separated GPS antennas. In these embodiments, the positioning unit 818 determines both the first radar position $\vec{n}_1$ and first direction $\vec{d}_1$ without the need for a separate direction sensor 816. In some embodiments, the radar-tracking module 800 or positioning unit 818 determines $\vec{d}_1$ from a temporal sequence of first radar positions recorded by the positioning unit 818, e.g., by extrapolating the temporal sequence in space.

The side-channel communicator 870, when executed by the processor 804, controls the side-channel transceiver 810 to wirelessly communicate with the second radar node 100(2). In some embodiments, the side-channel transceiver 810 receives data obtained by the second radar node 100(2), including the second radar position $\vec{n}_2 = (x_2, y_2, z_2)$ and second direction $\vec{d}_2$ of the second radar node 100(2), azimuthal boundaries $\phi_1^{(b)}$ and $\phi_2^{(b)}$, and the measured second slant range $R_2$ and second elevation angle $\theta_2$. The side-channel transceiver 810 transmits this received data over the system bus 802 to the RAM 808 for storage in the second node data 844. In some embodiments, the radar-tracking module 800 transmits to the second radar node 100(2), via the side-channel transceiver 810, one or more of the first radar position $\vec{n}_1 = (x_2, y_2, z_2)$, first direction $\vec{v}_1$, azimuthal boundaries $\phi_1^{(a)}$ and $\phi_2^{(a)}$, slant range $R_1$, and elevation angle $\theta_1$ obtained by the first radar node 100(1).

The half-space determiner 862, when executed by the processor 804, controls the radar-tracking module 800 to (i) calculate the baseline vector $\vec{b}$, (ii) determine the azimuthal offsets $\phi^{(a)}$ and $\phi^{(b)}$, (iii) calculate the baseline-reference azimuthal boundaries $\delta_1^{(a)}$, $\delta_2^{(a)}$, $\delta_1^{(b)}$, and $\delta_2^{(b)}$, and (iv) identify which of the half spaces I/II is the object half space 846.

The ground-track solver 872, when executed by the processor 804, controls the radar-tracking module 800 to calculate the correct ground-track solution 850 based on the first node data 842, the second node data 844, and the determined object half space 846. The ground-track solver 872 also controls the radar-tracking module 800 to determine the object position $\vec{u} = (x_U, y_U, z_U)$ from the ground-track solution 850. In some embodiments, the ground-track solver 872 controls the radar-tracking module 800 to first calculate both candidate ground-track solutions, and then use the object half space 846 to identify which of the candidate ground-track solutions is the correct ground-track solution 850.

The radar-tracking module 800 may also include an I/O block 820 for reporting the object position $\vec{u} = (x_U, y_U, z_U)$ to a peripheral device (not shown). The peripheral device may be a display that plots the object position $\vec{u}$ on a map. Alternatively, the I/O block 820 may be a network adapter for communicating the object position $\vec{u}$ to an external computing device. Alternatively or additionally, the radar-tracking module 800 may wirelessly transmit the object position $\vec{u}$ to the second radar node 100(2) via the side-channel transceiver 810. Alternatively or additionally, the radar-tracking module 800 may transmit the object position $\vec{u}$ to the radar control and acquisition module 814 to maintain tracking of the UAS 130.

The processor 804 may be any type of circuit capable of performing logic, control, and input/output operations. For example, the processor 804 may include one or more of a microprocessor with one or more central processing unit (CPU) cores, a graphics processing unit (GPU), a digital signal processor (DSP), a field-programmable gate array (FPGA), a system-on-chip (SoC), and a microcontroller unit (MCU). The processor 804 may also include a memory controller, bus controller, one or more co-processors, and/or other components that manage data flow between the processor 804 and other circuits communicably coupled to the system bus 802. The processor 804 may be implemented as a single integrated circuit (IC), or as a plurality of ICs. In some embodiments, one or more of the processor 804, ROM 806, and RAM 808 are implemented as a single IC. The processor 804 may use a complex instruction set computing (CISC) architecture, or a reduced instruction set computing (RISC) architecture.

Each of the I/O blocks 820, 822, and 824 may implement a communication protocol for sending data to, and receiving data from, a peripheral device. For example, each of the I/O blocks 820, 822, and 824 may be a serial communication interface (e.g., RS-232, RS-422, RS-485, etc.), a parallel communication interface (e.g., GPIB, PCI, SCSI, etc.), a synchronous serial communication interface (e.g., I2C, SPI, SSC, etc.), a universal serial bus (USB) interface, a multimedia card interface (e.g., SD card, Compact Flash, etc.), a wired network interface (e.g., Ethernet, Infiniband, Fibre Channel, etc.), a wireless network interface (e.g., WiFi, Bluetooth, BLE, ZigBee, ANT, etc.), a cellular network interface (e.g., 3G, 4G, 5G, LTE), an optical network interface (e.g., SONET, SDH, IrDA, etc.), and a fieldbus interface. The radar-tracking module 800 may include additional I/O functionality, as needed, for communicating with additional peripherals. For example, the radar-tracking module 800 may include one or more additional network interfaces (e.g., an Ethernet port or WiFi adapter) used to program the firmware 860.

While FIG. 8 shows the radar-tracking module 800 with one system bus 802, the radar-tracking module 800 may be implemented with a different type of architecture without departing from the scope hereof. For example, when the firmware 860 and data 840 are stored in separate memories, as shown in FIG. 8, the firmware 860 and data 840 may be transmitted to and from the processor 804 using separate buses. In this case, the firmware 860 and data 840 may be stored in separate memory spaces, thereby implementing a Harvard architecture. Alternatively, the processor 804 may include one or more layers of cache so that the radar-tracking module 800 implements a modified Harvard architecture using only the one system bus 802. In some embodiments, the firmware 860 is stored as an application in secondary storage (e.g., a hard drive), and loaded into the RAM 808 upon powering on (i.e., boot up); in this case, the application and the data 840 share the same memory space, thereby implementing a von Neumann architecture.

Any of the above system and method embodiments may be alternatively configured to locate and track only horizontal motion of an external object. In this case, the height h may be assumed to zero, and the object position $\vec{u} = (x_U, y_U)$ has only two spatial coordinates (i.e., the third spatial coordinate $z_U$ is ignored). Such embodiments may be used to track vehicles that move only, or primarily, horizontally. Examples includes watercraft and ground-based vehicles.

Any of the above system and method embodiments may be alternatively configured with the first and second radar nodes 100(1), 100(2) being stationary. In this case, the positions $\vec{n}_1$ and $\vec{n}_2$ of the first and second radar nodes 100(1), 100(2) are fixed, which in turn fixes the baseline b and azimuthal reference directions. As a result, the second radar node 100(2) does not need to continually transmit its position and azimuthal reference direction to the first radar node 100(1). Furthermore, it is easier to implement wired communication between the first and second radar nodes 100 (e.g., Ethernet cable or fiber-optic cable) when the radar nodes 100(1), 100(2) have fixed positions. Thus, the terms "transmit" and "receive" maybe used herein to include wired communication, in addition to or instead of, wireless communication.

Method Embodiments

Figure 9:
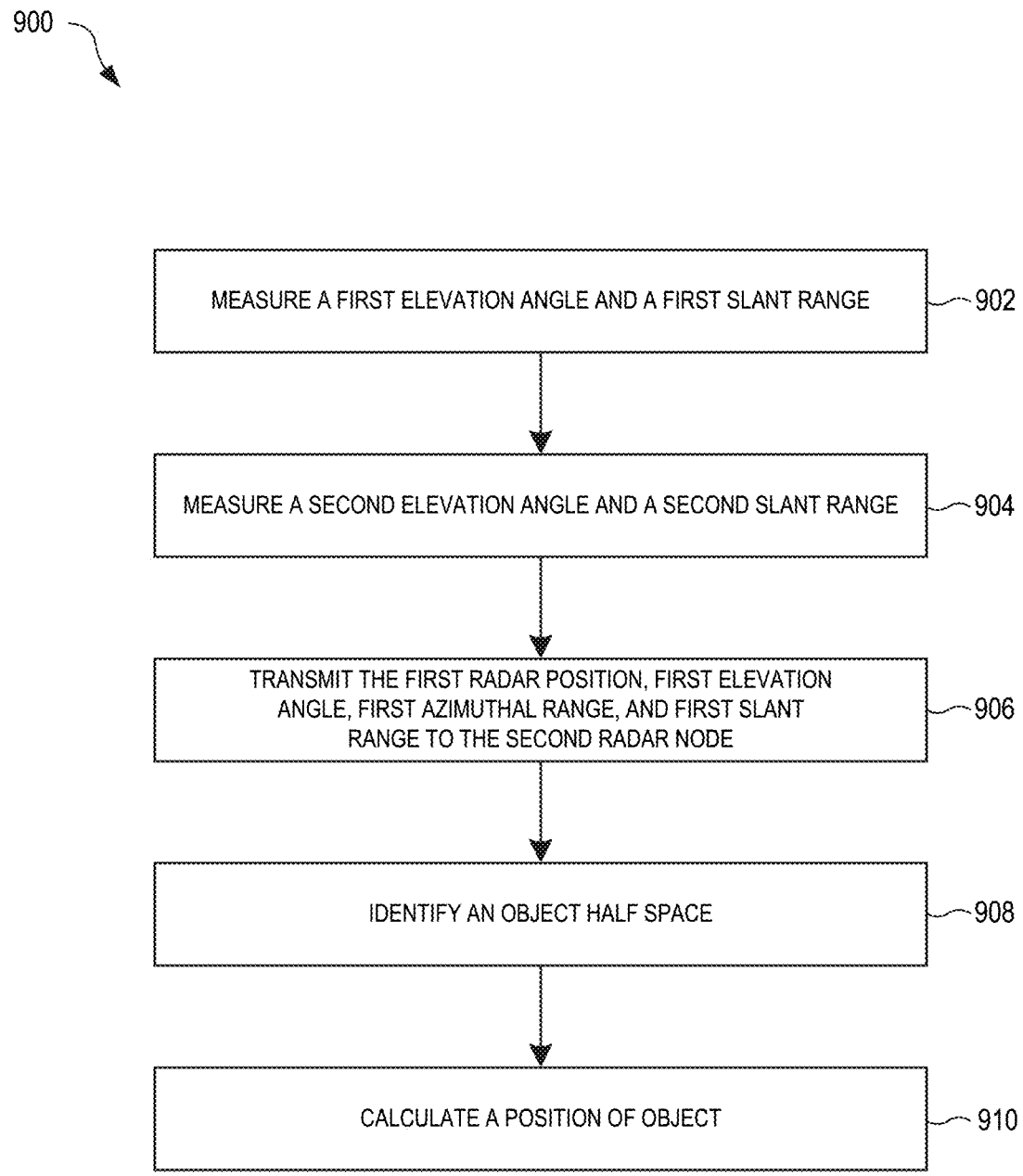
FIG. 9 is a flow chart of a surveillance method, in embodiments.

FIG. 9 is a flow chart of a surveillance method 900. The method 900 may be implemented using the first and second radar nodes 100(1), 100(2) of FIGS. 1-5. Unless described otherwise, the functional description of the first and second radar nodes 100(1), 100(2) of FIGS. 1-5 may be combined with the below-described blocks of FIG. 9. In the block 902, a first radar node measures a first elevation angle and a first slant range. The first radar node is located at a first radar position and operates within a first azimuth FOV. In one example of the block 902, the first radar node 100(1) of FIGS. 1-5, located at the first radar position $\vec{n}_1=(x_1, y_1, z_1)$ and operating within the first azimuth FOV $\Phi^{(a)}$, transmits the first radar beam 110(1) to measure the first slant range $R_1$ and first elevation angle $\theta_1$ of the UAS 130.

In the block 904, a second radar node measures a second elevation angle and a second slant range. The second radar node is located at a second radar position and operates within a second azimuth FOV. In one example of the block 904, the second radar node 100(2) of FIGS. 1-5, located at the second radar position $\vec{n}_2=(x_2,y_2, z_2)$ and operating within the second azimuth FOV $\Phi^{(b)}$, transmits the second radar beam 110(2) to measure the second slant range $R_2$ and second elevation angle $\theta_2$ of the UAS 130. The blocks 902 and 904 may occur in any order.

In the block 906, the first radar position, first elevation angle, first azimuth FOV, and first slant range are transmitted to the second radar node. In one example of the block 906, the second radar node 100(2) of FIGS. 1-5 wirelessly transmits (e.g., via the side-channel transceiver 810 in FIG. 8), the second radar position $\vec{n}_2=(x_2,y_2, z_2)$, the second elevation angle $\theta_2$, the second azimuth FOV $\Phi^{(b)}$, and the second slant range $R_2$ to the first radar node 100(1). In another example of the block 906, the first radar node 100(1) wirelessly transmits the first radar position $\vec{n}_1=(x_1, y_1, z_1)$, the first elevation angle $\theta_1$, the first azimuth FOV $\Phi^{(a)}$, and the first slant range $R_1$ to the second radar node 100(2).

In the block 908, an object half space, within which the object is located, is identified based on the first and second half spaces. The object half space is one of first and second half spaces separated by a vertical baseline plane that intersects the first and second radar positions. In one example of the block 908, the first radar node 100(1) identifies (e.g., using the radar-tracking module 800) in which of the half spaces I and II the UAS 130 is located. As shown in FIG. 3, the half spaces I and II are separated by the extended baseline b*.

In the block 910, a position of the object within the object half space is calculated based on the first and second elevation angles, the first and second slant ranges, and the first and second radar positions. In one example of the block 910, the first radar node 100(1) calculates (e.g., using the radar-tracking module 800 of FIG. 8) the object position $\vec{u}=(x_U, y_U, z_U)$ of the UAS 130 based on the first and second elevation angles $\theta_1$ and $\theta_2$, the first and second slant ranges $R_1$ and $R_2$, and the first and second radar positions $\vec{n}_1$ and $\vec{n}_2$.

Although not shown in FIG. 9, the method 900 may also include outputting the object position. For example, the first radar node 100(1) may report the object position $\vec{u}=(x_U, y_U, z_U)$ to a peripheral device, such as a display that plots the object position $\vec{u}$ on a map. Alternatively, the first radar node 100(1) may communicate the object position $\vec{u}$ to an external computing device, or wirelessly transmit the object position $\vec{u}$ to the second radar node 100(2) (e.g., via the side-channel transceiver 810) and/or another radar node 100.

In one embodiment of the method 900, the first radar node 100(1) wirelessly transmits the first radar position, first elevation angle, first azimuth FOV, and first slant range, to a radar processing station that receives and processes radar data. Similarly, the second radar node 100(1) wirelessly transmits the second radar position, second elevation angle, second azimuth FOV, and second slant range to the radar processing station. The radar processing station is external to the first and second radar nodes 100(1), 100(2), and need not be a radar system. The radar processing station processes the received data to identify the object half space and calculate the position of the object (i.e., the radar processing station performs the blocks 908 and 910 of the method 900). The radar processing station may then output the position of the object. For example, the radar processing station may wireless transmit the position to one or both of the first and second radar nodes 100(1), 100(2). Alternatively, the radar processing station may transmit the position of the object to another piece of equipment.

Figure 10:
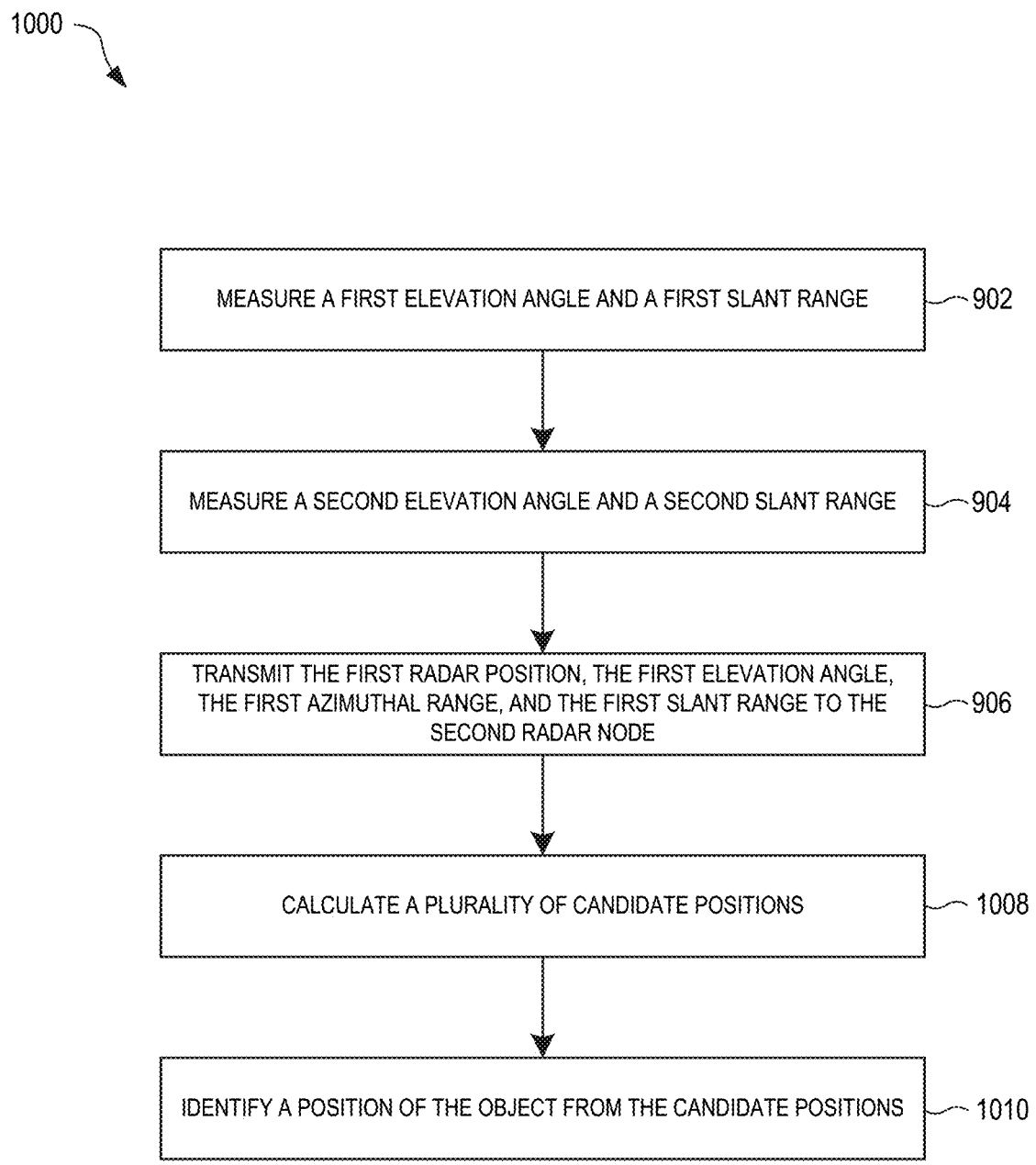
FIG. 10 is a flow chart of a surveillance method, in embodiments.

FIG. 10 is a flow chart of a surveillance method 1000 that is similar to the surveillance method 900 of FIG. 9 except that blocks 908 and 910 are replaced with blocks 1008 and 1010, respectively. The method 1000 may be implemented using the first and second radar nodes 100(1), 100(2) of FIGS. 1-5. Unless described otherwise, the functional description of the first and second radar nodes 100(1), 100(2) of FIGS. 1-5 may be combined with the below-described blocks of FIG. 10.

In the block 1008, a plurality of candidate positions is calculated based on the first and second elevation angles, the first and second slant ranges, and the first and second radar positions. In one example of the block 1008, the first radar node 100(1) calculates (e.g., using the radar-tracking module 800 of FIG. 8) the first and second points 304(1), 304(2) based on the first and second elevation angles $\theta_1$ and $\theta_2$, the first and second slant ranges $R_1$ and $R_2$, and the first and second radar positions $\vec{n}_1$ and $\vec{n}_2$. The first and second points 304(1), 304(2) represent solutions for the ground-track coordinates $x_U$ and $y_U$ of the object position $\vec{u}$ of the UAS 130.

In the block 1010, a position of the object is identified from the plurality of candidate positions based on the first and second azimuth FOVs. In one example of the block 1010, the first radar node 100(1) identifies which of the half spaces I and II is the object half space, and then selects, as the object position $\vec{u}$, the one of the points 304(1), 304(2) located within the object half space. The first radar node 100(1) may discard the other of the points 304(1), 304(2).

In one embodiment of the method 1000, the first radar node 100(1) wirelessly transmits the first radar position, first elevation angle, first azimuth FOV, and first slant range, to the radar processing station described previously. Similarly, the second radar node 100(1) wirelessly transmits the second radar position, second elevation angle, second azimuth FOV, and second slant range to the radar processing station. The radar processing station processes the received data to calculate the plurality of candidate positions identify the position of the object from the candidate positions (i.e., the radar processing station performs the blocks 1008 and 1010 of the method 1000). The radar processing station may then output the position of the object. For example, the radar processing station may wireless transmit the position to one or both of the first and second radar nodes 100(1), 100(2). Alternatively, the radar processing station may transmit the position of the object to another piece of equipment.

Additional Antenna Geometries

Figure 11:
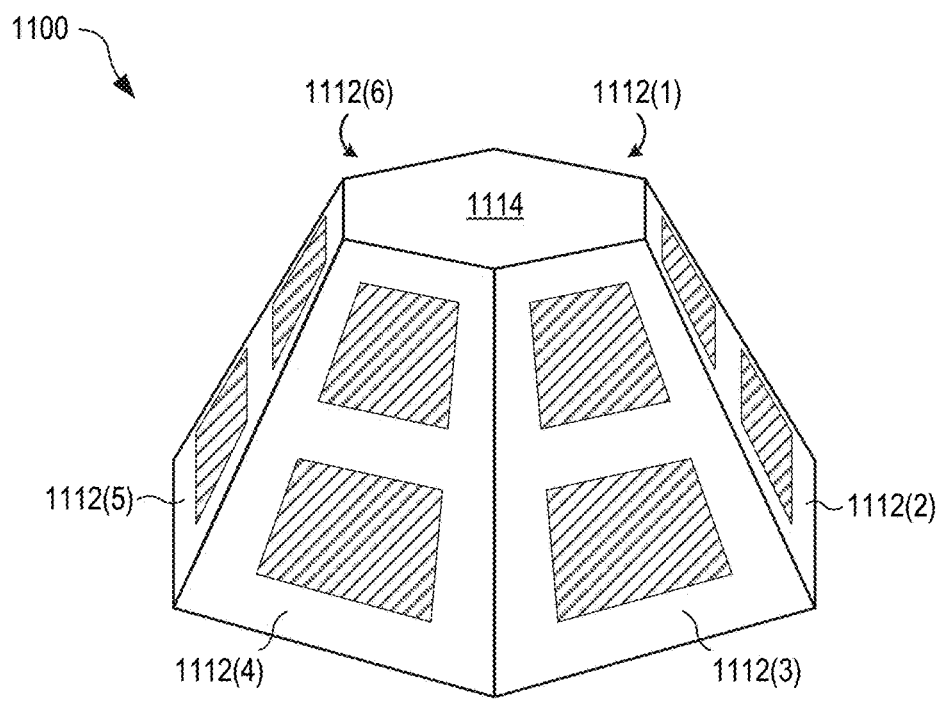
FIGS. 11 and 12 are perspective and side views, respectively, of an antenna structure that may be used with one or both of the first and second radar nodes of FIGS. 1-5, in an embodiment.
Figure 12:
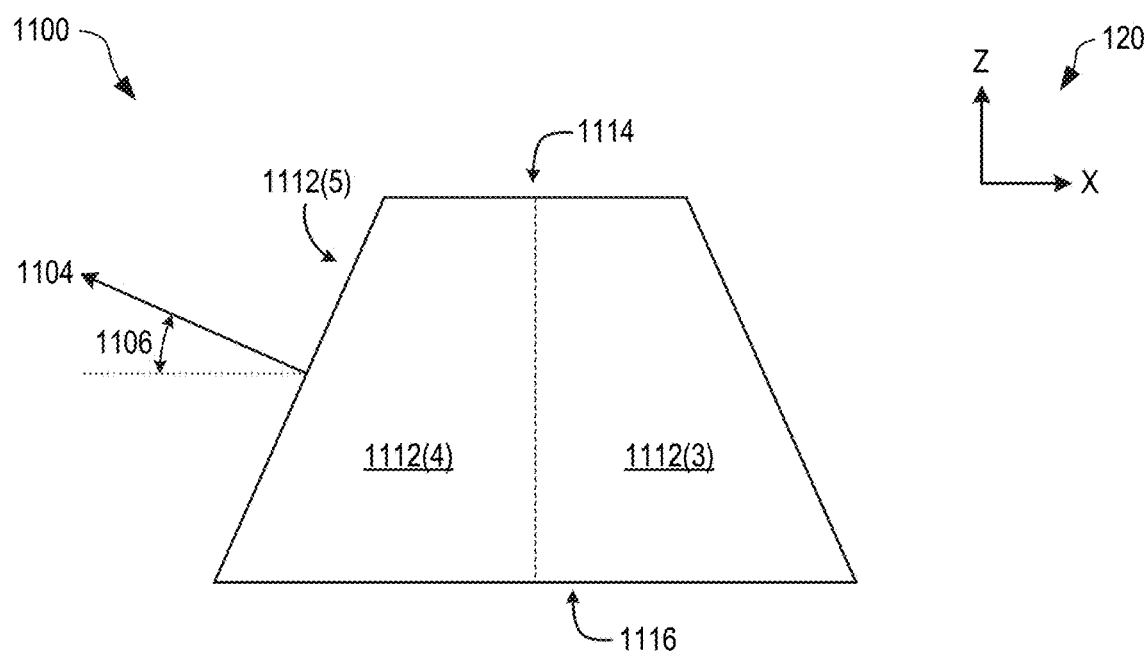

FIGS. 11 and 12 are perspective and side views, respectively, of an antenna structure 1100 that may be used with one or both of the first and second radar nodes 100(1), 100(2). The antenna structure 1100 is shaped as an oblique prism formed from n trapezoidal panels 1112 that operate similarly to the rectangular panels 612 of the antenna structure 600 shown in FIGS. 6 and 7. Top edges of the trapezoidal panels 1112 form an n-sided polygonal upper base 1114, and bottom edges of the trapezoidal panels 1112 form an n-sided polygonal lower base 1116. In the example of FIGS. 11 and 12, the upper base 1114 and lower base 1116 are geometrically similar except that the upper base 1114 has a smaller area than the lower base 1116. As a result, each trapezoidal panel 1112 opens upward, i.e., a normal vector 1104 to each trapezoidal panel 1112 forms a positive elevation angle 1106 relative to the horizontal x-y plane.

When the UAS 130 is located above the first and second radar nodes 100(1), 100(2) (e.g., when the height h in FIG. 3 is positive), it may not be necessary to scan the radar beams 110 at negative elevation angles. In such situations, the oblique-prism geometry of the antenna structure 1100 advantageously increases gain upward (i.e., toward the +z direction) to improve detection and tracking of the UAS 130. In other embodiments, the antenna structure 1100 is shaped such that the upper base 1114 has a larger area than the lower base 1116, in which case each trapezoidal panel 1112 faces a negative elevation angle 1106. These embodiments may be advantageous for tracking an object at a lower elevation than the radar nodes 100(1), 100(2) (e.g., when the height h in FIG. 3 is negative).

In FIGS. 11 and 12, all of the trapezoidal panels 1112 are identically shaped, the upper base 1114 is horizontally centered above the lower base 1116 in the x-y plane, and the upper base 1114 is parallel to the lower base 1116. Thus, the upper base 1114 and lower base 1116 each form a regular polygon. However, the trapezoidal panels 1112 may be shaped differently such that the upper base 1114 and lower base 1116 each form an irregular polygon. Additionally or alternatively, the trapezoidal panels 1112 may be shaped such that the upper base 1114 is not horizontally centered above the lower base 1116, or such that the upper base 1114 is not parallel to the lower base 1116. In such cases, the trapezoidal panels 1112 may not all be oriented at the same elevation angle 1106. While FIGS. 11 and 12 show the antenna structure 1100 with n=6 trapezoidal panels 1112, the antenna structure 1100 may have a different number of panels (e.g., n=2, 3, 4, 5, 8, 12, etc.) without departing from the scope hereof.

Figure 13:
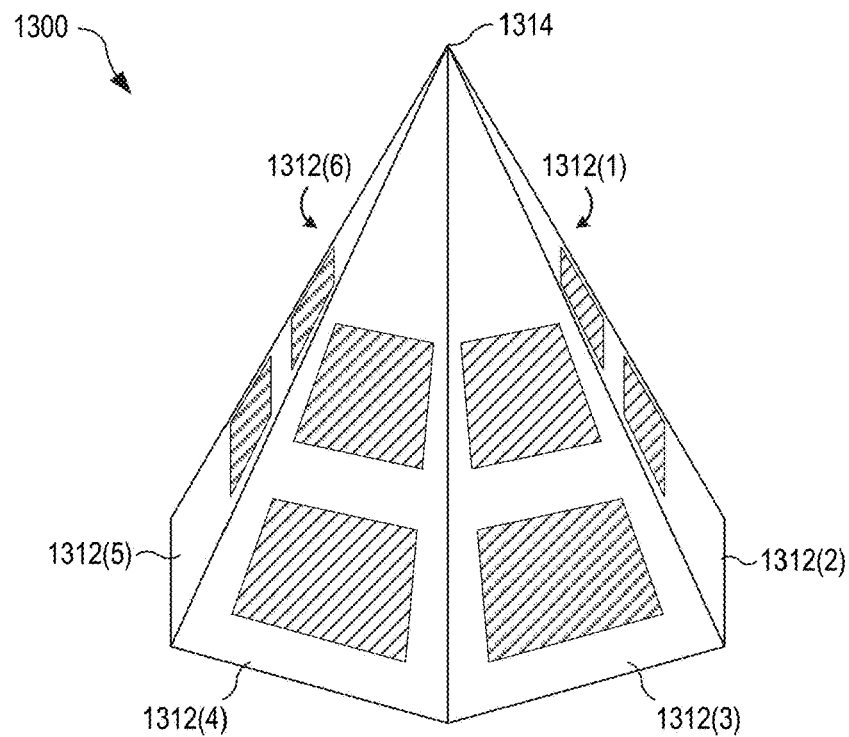
FIGS. 13 and 14 are perspective and side views, respectively, of an antenna structure that may be used with each of the first and second radar nodes of FIGS. 1-5, in an embodiment.
Figure 14:
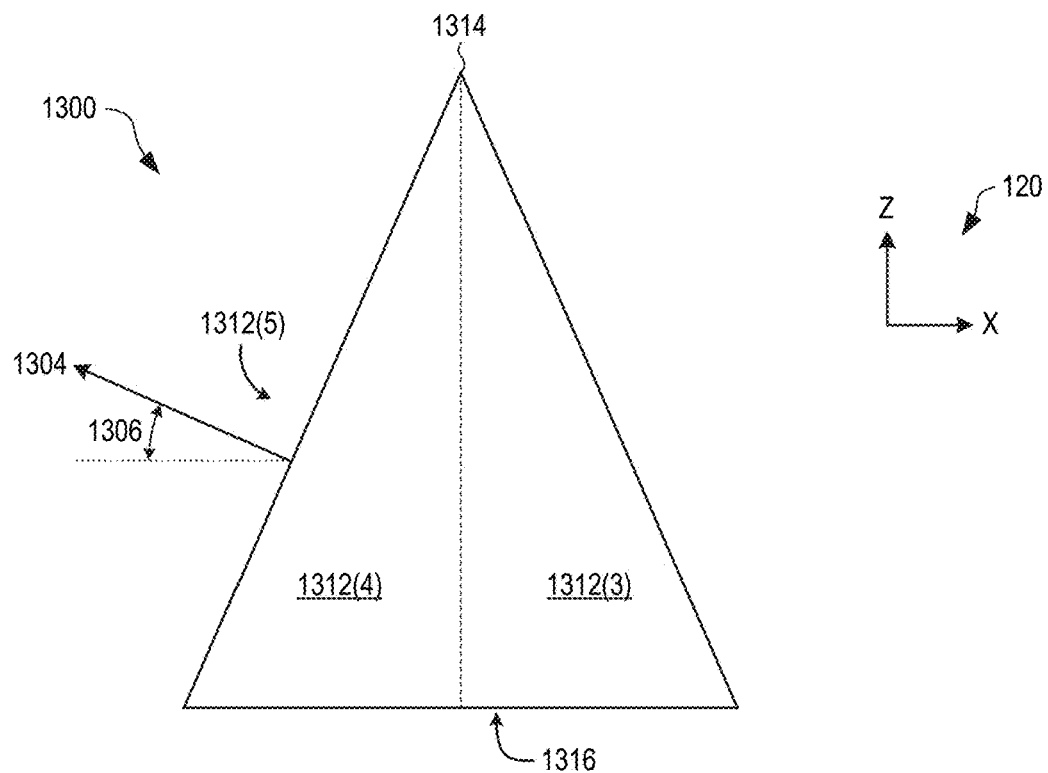

FIGS. 13 and 14 are perspective and side views, respectively, of an antenna structure 1300 that may be used with each of the first and second radar nodes 100(1), 100(2). The antenna structure 1300 is similar to the antenna structure 1100 of FIGS. 11 and 12 except that the antenna structure 1300 is shaped as a pyramid formed from n triangular panels 1312. Upper vertices of the triangular panels 1312 meet an at apex 1314, and bottom edges of the trapezoidal panels 1112 form an n-sided polygonal base 1316.

Similar to the antenna structure 1100 of FIGS. 11 and 12, each of the triangular panels 1312 has a normal vector 1304 that forms a positive elevation angle 1306 relative to the horizontal x-y plane. While FIGS. 13 and 14 show the antenna structure 1300 as a right regular pyramid (i.e., with the apex 1314 located over a centroid of the base 1316, and with the base 1316 shaped as a regular polygon), the antenna structure 1300 may be alternatively shaped as an oblique pyramid or a pyramid with an irregular base 1316. While FIGS. 13 and 14 show the antenna structure 1300 with n=6 triangular panels 1312, the antenna structure 1300 may have a different number of panels (e.g., n=2, 3, 4, 5, 8, 12, etc.) without departing from the scope hereof.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A surveillance method, comprising:
   measuring, with a first radar node located at a first radar position and operating within a first azimuth field of view, a first slant range to an object;
   measuring, with a second radar node located at a second radar position and operating within a second azimuth field of view, a second slant range to the object;
   transmitting the first radar position, the first azimuth field of view, and the first slant range to the second radar node;
   identifying, based on the first and second azimuth fields of view, an object half space within which the object is located, the object half space being one of first and second half spaces separated by a vertical baseline plane that intersects the first and second radar positions; and
   calculating a position of the object within the object half space based on the first and second slant ranges and the first and second radar positions.

2. The surveillance method of claim 1, wherein said identifying includes:
   selecting the first half space as the object half space when the first and second azimuth fields of view open into the first half space; and
   selecting the second half space as the object half space when the first and second azimuth fields of view open into the second half space.

3. The surveillance method of claim 1, wherein the first and second azimuth fields of view are both defined relative to a global reference direction.

4. The surveillance method of claim 1, wherein:
   the first azimuth field of view is defined relative to a first azimuthal reference direction that is local to the first radar node;
   the second azimuth field of view is defined relative to a second azimuthal reference direction that is local to the second radar node;
   said transmitting includes transmitting the first azimuthal reference direction to the second radar node; and
   said identifying is further based on the first and second azimuthal reference directions.

5. The surveillance method of claim 4, wherein:
   the first azimuthal reference direction is a first bearing of a first vehicle on which the first radar node is mounted; and
   the second azimuthal reference direction is a second bearing of a second vehicle on which the second radar node is mounted.

6. The surveillance method of claim 5, wherein each of the first and second vehicles is moving.

7. The surveillance method of claim 6, wherein one or both of the first and second bearings change during operation of the first and second radar nodes.

8. The surveillance method of claim 1, wherein:
   said measuring with the first radar node includes measuring a first elevation angle of the object;
   said measuring with the second radar node includes measuring a second elevation angle of the object;
   said transmitting includes transmitting the first elevation angle to the second radar node; and said calculating is further based on the first and second elevation angles.

9. The surveillance method of claim 8, wherein:
said measuring the first elevation angle includes:
transmitting a first fan beam having an azimuthal beam width that matches the first azimuth field of view, and
scanning the first fan beam through a first elevation field of view; and
said measuring the second elevation angle includes:
transmitting a second fan beam having an azimuthal beam width that matches the second azimuth field of view, and
scanning the second fan beam through a second elevation field of view.

10. The surveillance method of claim 8, wherein:
said measuring the first elevation angle includes:
transmitting a first radar beam with the first radar node;
scanning the first radar beam through a first elevation field of view;
scanning the first radar beam through the first azimuth field of view; and
said measuring with the second radar node includes:
transmitting a second radar beam with the second radar node;
scanning the second radar beam through a second elevation field of view; and
scanning the second radar beam through the second azimuth field of view.

11. The surveillance method of claim 8, wherein:
each of the first and second radar nodes measures the respective first and second elevation angle using one of: monopulse radar, conical scanning, and lobe switching; and
each of the first and second radar nodes measures the respective first and second slant ranges using one of: continuous-wave radar and pulsed radar.

12. The surveillance method of claim 11, wherein the continuous-wave radar is frequency-modulated continuous-wave radar.

13. The surveillance method of claim 1, wherein:
each of the first and second radar nodes includes a plurality of rectangular panels arranged as a right prism;
said measuring with the first radar node includes transmitting, with one of the plurality of rectangular panels of the first radar node, a first radar beam within the first azimuth field of view; and
said measuring with the second radar node includes transmitting, with one of the plurality of rectangular panels of the second radar node, a second radar beam within the second azimuth field of view.

14. The surveillance method of claim 13, wherein:
each panel of the plurality of rectangular panels includes a two-dimensional transmitting array of antenna elements spatially separated from a two-dimensional receiving array of antenna elements;
said measuring with the first radar node includes:
generating the first radar beam by driving the transmitting array of said one of the plurality of rectangular panels of the first radar node; and
receiving, with the receiving array of said one of the plurality of rectangular panels of the first radar node, a reflection of the first radar beam from the object; and
said measuring with the second radar node includes:
generating the second radar beam by driving the transmitting array of said one of the plurality of rectangular panels of the second radar node; and
receiving, with the receiving array of said one of the plurality of rectangular panels of the second radar node, a reflection of the second radar beam from the object.

15. The surveillance method of claim 13, wherein:
each panel of the plurality of rectangular panels of the first and second radar nodes includes one two-dimensional array of antenna elements;
said measuring with the first radar node includes:
transmitting the first radar beam by driving the one two-dimensional array of said one of the plurality of rectangular panels of the first radar node; and
receiving, with the one two-dimensional array of said one of the plurality of rectangular panels of the first radar node, a reflection of the first radar beam from the object; and
said measuring with the second radar node includes:
transmitting the second radar beam by driving the one two-dimensional array of said one of the plurality of rectangular panels of the second radar node; and
receiving, with the one two-dimensional array of said one of the plurality of rectangular panels of the second radar node, a reflection of the second radar beam from the object.

16. The surveillance method of claim 15, wherein said transmitting the first radar beam and said receiving the reflection of the first radar beam occur simultaneously.

17. The surveillance method of claim 15, wherein said transmitting the first radar beam occurs prior to said receiving the reflection of the first radar beam.

18. The surveillance method of claim 1, further comprising:
measuring, with the first radar node, a first velocity of the object;
transmitting the first velocity to the second radar node;
measuring, with the second radar node, a second velocity of the object; and
determining movement of the object based on the first and second velocities.

19. The surveillance method of claim 18, wherein:
said transmitting further includes transmitting a first vehicular velocity of a first vehicle on which the first radar node is mounted; and
said determining movement of the object is further based on the first vehicular velocity and a second vehicular velocity of a second vehicle on which the second radar node is mounted.

20. A surveillance method, comprising:
measuring, with a first radar node located at a first radar position and operating within a first azimuth field of view, a first slant range to an object and a first elevation angle of the object;
measuring, with a second radar node located at a second radar position and operating within a second azimuth field of view, a second slant range to the object and a second elevation angle of the object;
transmitting the first radar position, the first azimuth field of view, the first slant range, and the first elevation angle to the second radar node;
determining, based on the first and second elevation angles, a height of the object;
calculating first and second ground-track solutions based on the height, the first and second slant ranges, and the first and second radar positions, the first ground-track solution being located on a first side of a baseline defined by the first and second radar positions, the second ground-track solution being located on a second side of the baseline opposite to the first side;

selecting, when the first and second azimuth fields of view are both located on the first side of the baseline, the first ground-track solution as a position of the object; and selecting, when the first and second azimuth fields of view are both located on the second side of the baseline, the second ground-track solution as the position of the object.

21. A radar node, comprising:

a plurality of antenna arrays arranged to transmit and receive radar beams with full azimuthal coverage; and an electronics module coupled to the plurality of antenna arrays, the electronics module comprising:
  a processor; and
  a memory communicably coupled with the processor and storing machine-readable instructions that, when executed by the processor, control the electronics module to:
  (i) receive a first radar position of an external radar node, a first slant range to an object measured by the external radar node, and a first azimuth field of view of the external radar node within which the object was detected,
  (ii) operate at least one of the plurality of antenna arrays to measure a second slant range to the object within a second azimuth field of view of said at least one of the plurality of antenna arrays,
  (iii) identify, based on the first and second azimuth fields of view, an object half space within which the object is located, the half space being one of first and second half spaces separated by a vertical baseline plane that intersects the first radar position and a second radar position of the radar node,
  (iv) calculate a position of the object within the object half space based on the first and second slant ranges and the first and second radar positions, and
  (v) output the position of the object.

22. The radar node of claim 21, further comprising a side-channel transceiver communicably coupled with the electronics module;

wherein the machine-readable instructions that, when executed by the processor, control the electronics module to receive are configured to control the electronics module to wirelessly receive, via the side-channel transceiver, the first radar position, the first slant range, and the first azimuth field of view.

23. The radar node of claim 22, the memory storing additional machine-readable instructions that, when executed by the processor, control the side-channel transceiver to wirelessly transmit the second slant range, the second azimuth field of view, and the second radar position.

24. The radar node of claim 21, wherein the machine-readable instructions that, when executed by the processor, control the electronics module to identify the object half space are configured to control the electronics module to:
  select the first half space as the object half space when the first and second azimuth fields of view open into the first half space, and
  select the second half space as the object half space when the first and second azimuth fields of view open into the second half space.

25. The radar node of claim 21, wherein the first and second azimuth fields of view are both defined relative to a global reference direction.

26. The radar node of claim 21, wherein:

the first azimuth field of view is defined relative to a first azimuthal reference direction that is local to the external radar node;

the second azimuth field of view is defined relative to a second azimuthal reference direction that is local to the radar node;

the memory stores additional machine-readable instructions that, when executed by the processor, control the electronics module to wirelessly receive the first azimuthal reference direction via a side-channel transceiver; and the machine-readable instructions that, when executed by the processor, control the electronics module to identify the object half space are configured to control the electronics module to identify the object half space further based on the first and second azimuthal reference directions.

27. The radar node of claim 26, wherein:

the first azimuthal reference direction is a first bearing of a first vehicle on which the external radar node is mounted; and the second azimuthal reference direction is a second bearing of a second vehicle on which the radar node is mounted.

28. The radar node of claim 21, wherein:

the machine-readable instructions that, when executed by the processor, control the electronics module to receive are configured to control the electronics module to receive a first elevation angle of the object;

the machine-readable instructions that, when executed by the processor, control the electronics module to operate are configured to control the electronics module to operate the at least one of the plurality of antenna arrays to measure a second elevation angle of the object; and the machine-readable instructions that, when executed by the processor, control the electronics module to calculate are configured to control the electronics module to calculate the position of the object further based on the first and second elevation angles.

29. The radar node of claim 28, wherein the machine-readable instructions that, when executed by the processor, control the electronics module to measure the second elevation angle are configured to control the electronics module to operate the at least one of the plurality of antenna arrays to:
  transmit a fan beam having an azimuthal beam width that matches the second azimuth field of view, and
  scan the fan beam through an elevation field of view.

30. The radar node of claim 28, wherein the machine-readable instructions that, when executed by the processor, control the electronics module to measure the second elevation angle are configured to control the electronics module to operate the least one of the plurality of antenna arrays to:
  transmit a radar beam,
  scan the radar beam through an elevation field of view, and
  scan the radar beam through the second azimuth field of view.

31. The radar node of claim 28, wherein:

the machine-readable instructions that, when executed by the processor, control the electronics module to measure the second elevation angle are configured to control the electronics module to measure the second elevation angle using one of: monopulse radar, conical scanning, and lobe switching; and the machine-readable instructions that, when executed by the processor, control the electronics module to measure the second slant range are configured to control the electronics module to measure the second slant range using one of continuous-wave radar and pulsed radar.

32. The radar node of claim 22, further comprising a plurality of rectangular panels arranged as a right prism, wherein each of the plurality of rectangular panels includes one transmitting array of the plurality of antenna arrays, and one corresponding receiving array of the plurality of antenna arrays.

33. The radar node of claim 32, wherein each transmitting array is vertically offset from the corresponding receiving array.

34. The radar node of claim 33, further comprising an isolation structure between each transmitting array and the corresponding receiving antenna array.

35. The radar node of claim 32, wherein each transmitting array and each receiving array comprises a two-dimensional array of antenna elements.

36. The radar node of claim 32, wherein each transmitting array and each receiving array comprises a one-dimensional array of antenna elements.

37. The radar node of claim 32, wherein the plurality of rectangular panels consists of five rectangular panels arranged to form a right pentagonal prism.

38. The radar node of claim 22, further comprising a plurality of rectangular panels arranged as a right prism, wherein each of the plurality of rectangular panels includes one antenna array operable to both transmit a radar beam and receive a reflection of the radar beam off the object.

39. The radar node of claim 38, wherein the machine-readable instructions that, when executed by the processor, control the electronics module to operate are configured to control the electronics module to operate the one antenna array of any of the plurality of rectangular panels to simultaneously transmit the radar beam and receive the reflection.

40. The radar node of claim 38, wherein the machine-readable instructions that, when executed by the processor, control the electronics module to operate are configured to control the electronics module to operate the one antenna array of any one of the plurality of rectangular panels to receive the reflection after transmitting the radar beam.

41. The radar node of claim 22, wherein:
the machine-readable instructions that, when executed by the processor, control the electronics module to receive are configured to control the electronics module to wirelessly receive, via a side-channel transceiver, a first velocity of the object;
the machine-readable instructions that, when executed by the processor, control the electronics module to operate are configured to control the electronics module to operate the least one of the plurality of antenna arrays to measure a second velocity of the object;
the memory stores additional machine-readable instructions that, when executed by the processor, control the electronics module to determine movement of the object based on the first and second velocities; and
the machine-readable instructions that, when executed by the processor, control the electronics module to output are configured to control the electronics module to output the determined movement.

42. A radar node, comprising:
a plurality of antenna arrays arranged to transmit and receive radar beams with full azimuthal coverage; and
an electronics module coupled to the plurality of antenna arrays, the electronics module comprising:
a processor; and
a memory communicably coupled with the processor and storing machine-readable instructions that, when executed by the processor, control the electronics module to:
(i) receive a first radar position of an external radar node, a first slant range to an object measured by the external radar node, a first azimuth field of view of the external radar node within which the object was detected, and a first elevation angle of the object measured by the external radar node,
(ii) operate at least one of the plurality of antenna arrays to measure a second slant range to the object within a second azimuth field of view of said at least one of the plurality of antenna arrays,
(iii) operate at least one of the plurality of antenna arrays to measure a second elevation angle of the object;
(iv) calculate first and second ground-track solutions based on the height, the first and second slant ranges, and the first and second radar positions, the first ground-track solution being located on a first side of a baseline defined by the first and second radar positions, the second ground-track solution being located on a second side of the baseline opposite to the first side,
(v) select, when the first and second azimuth fields of view are both located on the first side of the baseline, the first ground-track solution as a position of the object,
(vi) select, when the first and second azimuth fields of view are both located on the second side of the baseline, the second ground-track solution as the position of the object, and
(vii) output the position of the object.

43. A surveillance method, comprising:
measuring, with a first radar node located at a first radar position and operating within a first azimuth field of view, a first slant range to an object;
measuring, with a second radar node located at a second radar position and operating within a second azimuth field of view, a second slant range to the object;
transmitting, by the first radar node, the first radar position, the first azimuth field of view, and the first slant range to a radar processing station;
transmitting, by the second radar node, the second radar position, the second azimuth field of view, and the second slant range to the radar processing station;
identifying, by the radar processing station and based on the first and second azimuth fields of view, an object half space within which the object is located, the object half space being one of first and second half spaces separated by a vertical baseline plane that intersects the first and second radar positions; and
calculating, by the radar processing station, a position of the object within the object half space based on the first and second slant ranges and the first and second radar positions.

44. The surveillance method of claim 43,
said measuring with the first radar node includes measuring a first elevation angle of the object;
said measuring with the second radar node includes measuring a second elevation angle of the object;
said transmitting by the first radar node includes transmitting the first elevation angle to the radar processing station;

said transmitting by the second radar node includes transmitting the second elevation angle to the radar processing station; and said calculating is further based on the first and second elevation angles.

45. The surveillance method of claim 43, further comprising outputting the position of the object.

46. The surveillance method of claim 45, wherein said outputting comprises transmitting, by the radar processing station, the position of the object to one or both of the first and second radar nodes.

47. A surveillance method, comprising:

measuring, with a first radar node located at a first radar position and operating within a first azimuth field of view, a first slant range to an object and a first elevation angle of the object;

measuring, with a second radar node located at a second radar position and operating within a second azimuth field of view, a second slant range to the object and a second elevation angle of the object;

transmitting, by the first radar node, the first radar position, the first azimuth field of view, the first slant range, and the first elevation angle to a radar processing station;

transmitting, by the second radar node, the second radar position, the second azimuth field of view, the second slant range, and the second elevation angle to the radar processing station;

determining, by the radar processing station and based on the first and second elevation angles, a height of the object;

calculating, by the radar processing station, first and second ground-track solutions based on the height, the first and second slant ranges, and the first and second radar positions, the first ground-track solution being located on a first side of a baseline defined by the first and second radar positions, the second ground-track solution being located on a second side of the baseline opposite to the first side;

selecting, by the radar processing station, the first ground-track solution as a position of the object when the first and second azimuth fields of view are both located on the first side of the baseline; and selecting, by the radar processing station, the second ground-track solution as the position of the object when the first and second azimuth fields of view are both located on the second side of the baseline.

48. The surveillance method of claim 47, further comprising outputting the position of the object.

49. The surveillance method of claim 48, wherein said outputting comprises transmitting, by the radar processing station, the position of the object to one or both of the first and second radar nodes.

\* \* \* \* \*